United States Patent
Ishino et al.

(12)

(10) Patent No.: US 6,727,885 B1
(45) Date of Patent: Apr. 27, 2004

(54) GRAPHICAL USER INTERFACE AND POSITION OR ATTITUDE DETECTOR

(75) Inventors: Yukinobu Ishino, Tokyo (JP); Atsumi Kasuya, Tokyo (JP)

(73) Assignees: Nikon Corporation, Tokyo (JP); Nikon Technologies, Inc., Tokyo (JP)

( * ) Notice: Subject to any disclaimer, the term of this patent is extended or adjusted under 35 U.S.C. 154(b) by 603 days.

(21) Appl. No.: 09/656,464

(22) Filed: Sep. 6, 2000

(30) Foreign Application Priority Data

| Sep. 7, 1999 | (JP) | 11-252732 |
| Oct. 1, 1999 | (JP) | 11-281462 |
| Jul. 19, 2000 | (JP) | 2000-218969 |
| Jul. 19, 2000 | (JP) | 2000-218970 |

(51) Int. Cl.[7] ............................................. G09G 5/00
(52) U.S. Cl. ...................... 345/156; 345/179; 348/181; 348/745
(58) Field of Search ................... 345/856–862, 345/156–184; 348/734, 180, 181, 191, 744–746, 747, 749; 702/150–154

(56) References Cited

U.S. PATENT DOCUMENTS

| 4,880,968 A | 11/1989 | Kwang-Chien | 250/221 |
| 4,933,864 A | 6/1990 | Evans, Jr. et al. | |
| 5,045,843 A | 9/1991 | Hansen | |
| 5,227,985 A | 7/1993 | DeMenthon | |
| 5,440,114 A | 8/1995 | Barbier et al. | 250/206.2 |
| 5,515,079 A * | 5/1996 | Hauck | 345/157 |
| 5,757,674 A | 5/1998 | Marugame | |
| 5,835,078 A | 11/1998 | Arita et al. | 345/158 |
| 5,856,844 A | 1/1999 | Batterman et al. | |
| 5,909,027 A | 6/1999 | Ohura et al. | 250/208.1 |
| 6,100,538 A | 8/2000 | Ogawa | 250/559.29 |
| 6,275,214 B1 * | 8/2001 | Hansen | 345/158 |
| 6,285,359 B1 | 9/2001 | Ogasawara et al. | 345/175 |
| 6,384,861 B1 * | 5/2002 | Lindsey | 345/157 |
| 6,529,853 B1 * | 3/2003 | Bauer | 702/152 |
| 6,545,661 B1 * | 4/2003 | Goschy et al. | 345/158 |
| 6,618,076 B1 * | 9/2003 | Sukthankar et al. | 348/180 |

FOREIGN PATENT DOCUMENTS

| JP | 2-306294 | 12/1990 |
| JP | A 3-176718 | 7/1991 |
| JP | 4-305687 | 10/1992 |
| JP | 6-308879 | 11/1994 |
| JP | 7-98214 | 4/1995 |
| JP | 7-121293 | 5/1995 |
| JP | 8-335136 | 12/1996 |
| JP | 9-231373 | 9/1997 |
| JP | 10-116341 | 5/1998 |
| JP | 11-39496 | 2/1999 |

* cited by examiner

*Primary Examiner*—Lun-Yi Lao
(74) *Attorney, Agent, or Firm*—Oliff & Berridge, PLC

(57) ABSTRACT

A graphical user interface is proposed for generating an interface signal with a target on a display aimed. An image sensor has an image plane on which an image of the display including characteristic points is formed, a point of the image formed at a predetermined position of the image plane corresponding to the target. A processor calculates the position of the target on the display relative to the characteristic points on the basis of the output of the image sensor including the information of the positions of the characteristic points. And the interface signal is generated with the position of the target calculated. More specifically, the processor includes an image processor for identifying the positions of the characteristic points on the image plane, a first processor for calculating a first data on the basis of the positions of the characteristic points on the image plane, and a second processor for calculating a second data on the basis of the first data and the positions of the characteristic points on the image plane. This is not only useful in the graphical user interface, but also in detecting the position of a target point or the attitude of a three-dimensional object in general.

31 Claims, 25 Drawing Sheets

GRAPHICAL USER INTERFACE AND POSITION OR ATTITUDE DETECTOR

BACKGROUND OF THE INVENTION

This application is based upon and claims priority of Japanese Patent Applications No. 11-252732 filed on Sep. 7, 1999, No. 11-281462 filed on Oct. 1, 1999, No. 2000-218969 filed on Jul. 19, 2000 and No. 2000-218970 filed on Jul. 19, 2000, the contents being incorporated herein by reference.

1. Field of the Invention

The present invention relates to a Graphical User Interface (GUI) for a computer or an amusement game, and to a detector for detecting a position or an attitude of a target.

2. Description of Related Art

In this field of the art, various types of Graphical User Interface have been proposed for a computer or an amusement game.

For example, a Graphical User Interface on a wide screen display has been proposed for the purpose of a presentation or the like, in which a projector is connected to a computer for projecting a display image on a wide screen so that a number of audience may easily appreciate the presentation. In this case, a laser pointer or the like is prepared for pointing an object such as an icon or a text on the wide screen to input a command relating to the object pointed by the laser pointer.

In an amusement such as a shooting game, on the other hand, a scene including an object is presented on a cathode ray tube display of a game machine under a control of a computer. A user remote from the display tries to aim and shoot the object with a gun, and the game machine judges whether or not the object is successfully shot.

For the purpose of the above mentioned Graphical User Interface, it has been proposed to fixedly locate a CCD camera relative to the screen for detecting a bright spot on the wide screen caused by a laser beam to thereby detect the position of the bright spot on the screen.

It has been also proposed to prepare a plurality of light emitting elements on the screen in the vicinity of the projected image for the purpose of analyzing at a desired place the intensities and directions of light received from the light emitting elements to detect a position of a target on the screen.

However, there have been considerable problems and disadvantages still left in the related art, such as in seeking freedom or easiness in use, accuracy or speed in detection and size or cost in the practical product.

Laid-open Patent Application Nos. 2-306294, 3-176718, 4-305687, 6-308879, 9-231373 and 10-116341 disclose various attempts in this field of art.

SUMMARY OF THE INVENTION

In order to overcome the problems and disadvantages, the invention provides a graphical user interface for generating an interface signal with a target on a display aimed. In the graphical user interface, an image sensor has an image plane on which an image of the display including characteristic points is formed, a point of the image formed at a predetermined position of the image plane corresponding to the target. A processor calculates the position of the target on the display relative to the characteristic points on the basis of the output of the image sensor including the information of the positions of the characteristic points. And the interface signal is generated with the position of the target calculated. Thus, the interface signal is generated at any desired place remote from the display.

According to another feature of the invention, aiming device is provided for helping the image sensor to form the image of the display with the target in coincidence with the predetermined position.

According to still another feature of the invention, a controller orders the image sensor to take the image of the display. More specifically, the controller is designed to order the image sensor to take one image in response to a manual operation Alternatively, the controller is designed to order the image sensor to take a series of images in succession.

According to a further feature of the invention, the processor for calculating the position of the target includes an image processor for identifying the positions of the characteristic points on the image plane. The processor further includes a first processor for calculating a first data on the basis of the positions of the characteristic points on the image plane. Finally the processor includes a second processor for calculating a second data on the basis of the first data and the positions of the characteristic points on the image plane. The position of the target on the display is detected on the basis of the second data.

The above mentioned feature is not only useful in Graphical User Interface, but also in detecting the position of a target point or the attitude of a three-dimensional object in general.

In the invention, the information of attitude of the object is utilized by the position detection, and then by Graphical User Interface. In terms of the position detection or Graphical User Interface, the target point should be aimed for detection. However, any specific target point need not be aimed in the case of solely detecting the attitude of an object as long as the image of necessary characteristic points of the object are formed on the image sensing plane.

According to another feature of the invention, the output of the image sensor is transmitted to an outside processor for a calculation of the position of the target. This is advantageous in utilizing graphical user interface in a computer or a shooting game.

According to a further feature of the invention, a projector projects an image including characteristic points on a screen acting as the display, and the image on the screen is received by the image sensor. In this case, the position sensing is successful even if an optical axis of the projector is inclined with respect to the screen.

Other features and advantages according to the invention will be readily understood from the detailed description of the preferred embodiments in conjunction with the accompanying drawings.

DETAILED DESCRIPTION OF THE PREFERRED EMBODIMENTS

Embodiment 1

Figure 1:
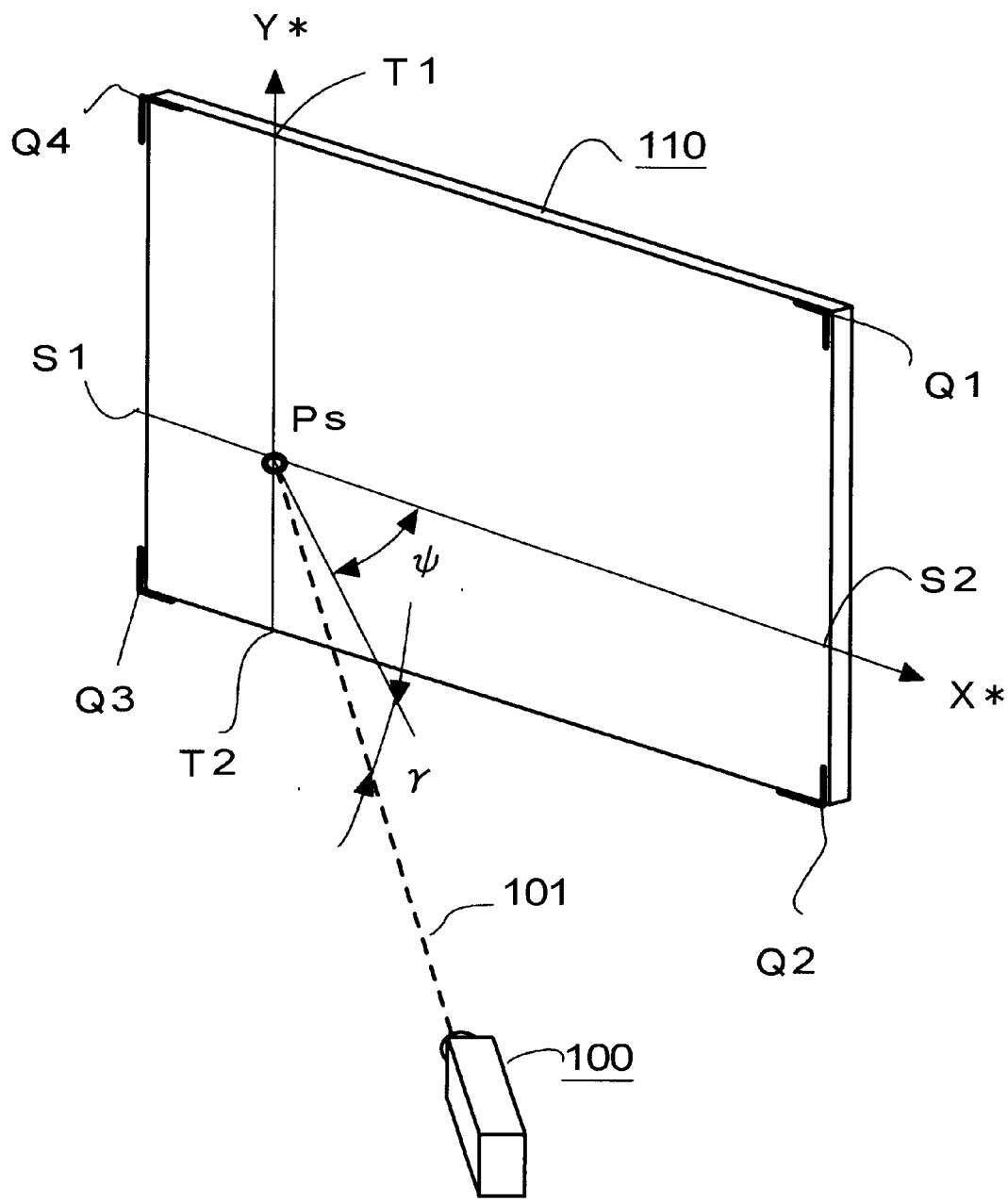
FIG. 1 represents a perspective view of Embodiment 1 according to the present invention.

FIG. 1 represents a perspective view of Embodiment 1 showing the system concept of the position detecting device according to the present invention.

Main body 100 of Embodiment 1 is for detecting a coordinate of a target point Ps on a given rectangular plane 110 defined by characteristic points Q1, Q2, Q3 and Q4. Main body 100 may be handled at any desired position relative to plane 110. Broken line 101 is an optical axis of image sensing plane of camera 1 located within main body 100, the optical axis leading form the center of the image sensing plane perpendicularly thereto to target point Ps on plane 110.

The plane to be detected by Embodiment 1 is a rectangle appearing on an object or a figure such as a display of a monitor for a personal computer, a projected image on a screen, or a computer graphic image. The characteristic points according to the present invention may be the corners themselves of a rectangular image projected on a screen. Alternatively, the characteristic points may be projected within an image on the screen to define a new rectangular inside the image projected on the screen.

Figure 2:
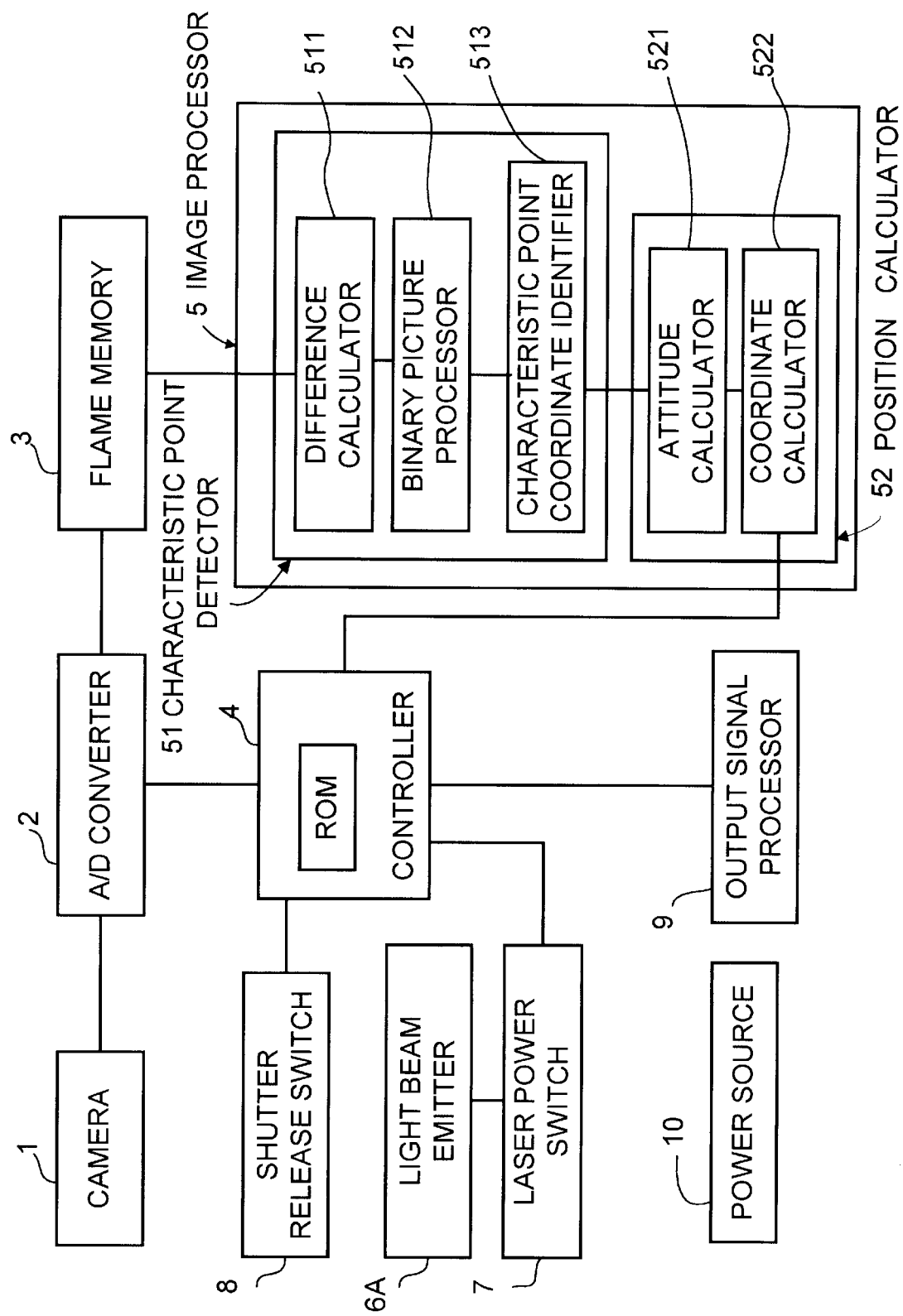
FIG. 2 represents a block diagrams of the main body of Embodiment 1.
Figure 3:
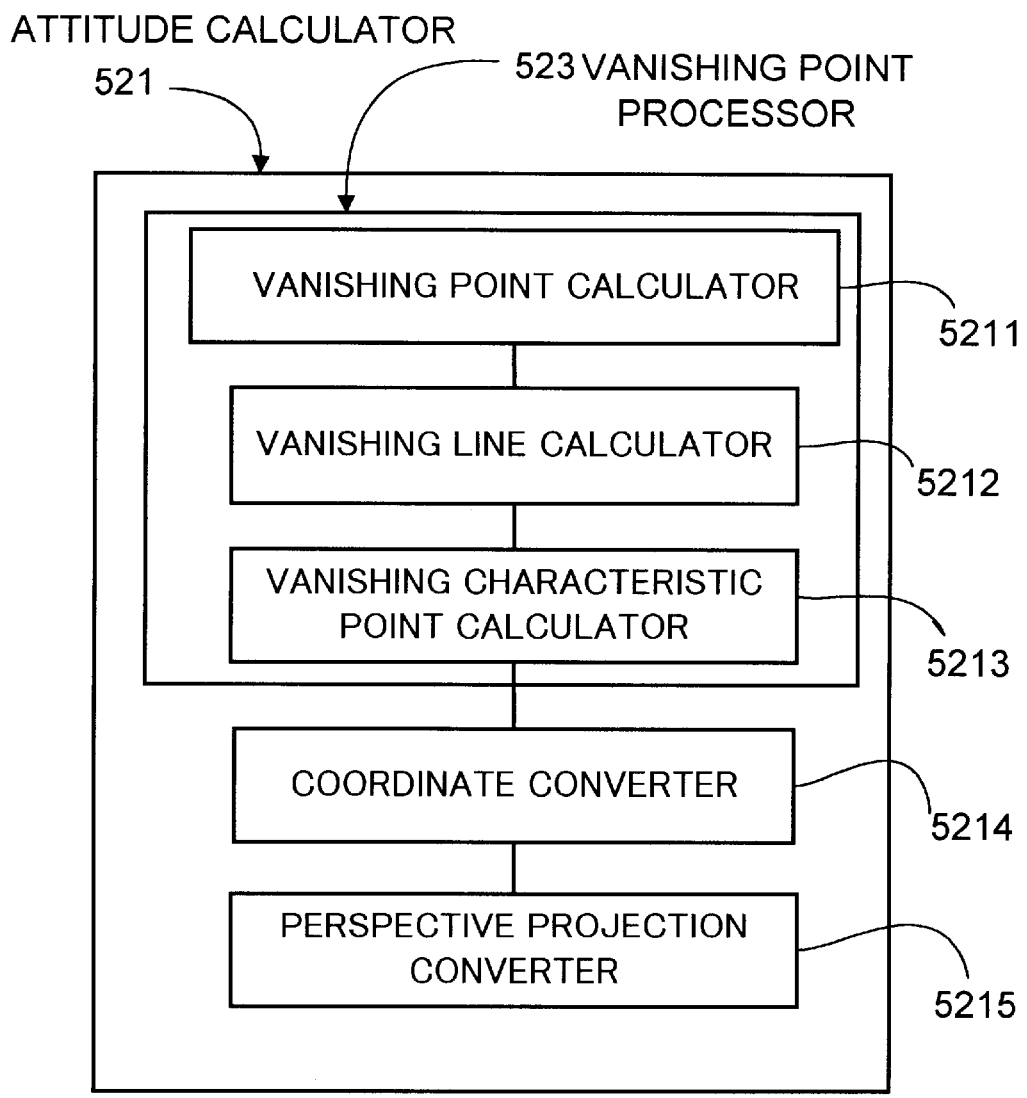
FIG. 3 represents a detailed partial block diagram of FIG. 2.
Figure 4:
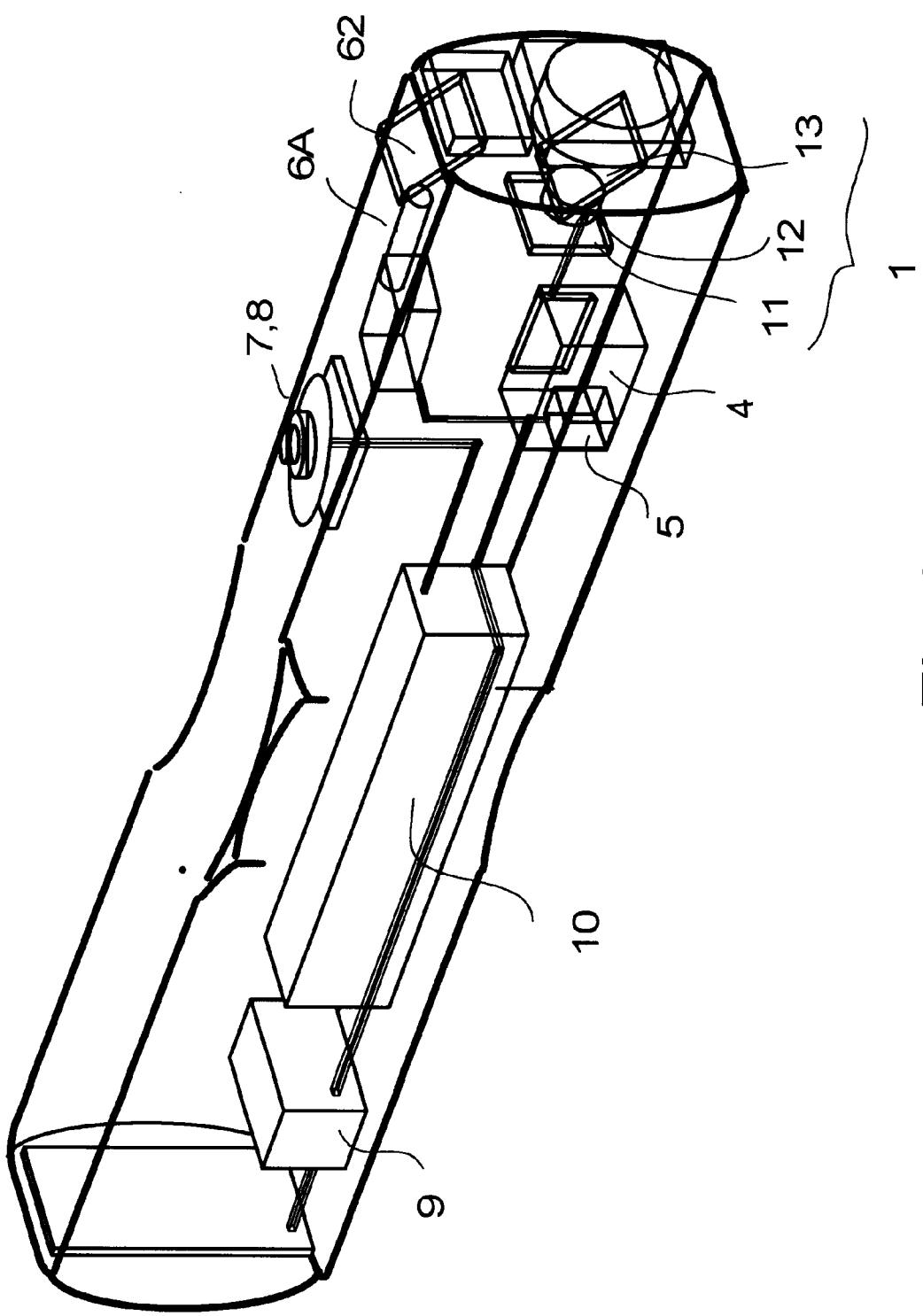
FIG. 4 represents the perspective view of the main body.

FIG. 2 shows the block diagrams of the main body 100, while FIG. 3 a detailed partial block diagram of FIG. 2. Further, FIG. 4 represents the perspective view of main body 100.

In FIG. 2, camera 1 includes a lens system and an image sensor. Camera 1 may be a digital still camera with CCD, or a video camera.

Camera 1 needs to define an aiming point for designating the target point Ps on plane 110. According to Embodiment 1, the aiming point is defined at the center of the image sensing plane as origin Om of image coordinate (X-Y coordinate). A/D converter 2 converts the image data taken by camera 1 into digital image data. Frame memory 3 temporally stores the digital image data at a plurality of addresses corresponding to the location of the pixels of CCD. Frame memory 3 is of a capacity of several ten megabytes (MS) for storing a plurality of images which will be taken successively.

Controller 4 includes Read Only Memory (ROM) storing a program for processing the perspective view calculation and a program for controlling other various functions. Image processor 5 includes characteristic point detector 51 and position calculator 52. Characteristic point detector 51 detects the characteristic points defining the rectangular plane in a space on the basis of the image data taken by camera 1, the detailed structure of characteristic point detector 51 being explained later. Position calculator 52 determines the position of the target point on the basis of the coordinate of the identified characteristic points.

Although not shown in the drawings, characteristic point detector 51 includes a detection checker for checking whether or not the characteristic points have been successfully detected from the digital image data temporally stored in frame memory 3 under the control of controller 4. By means of such a checker, an operator who has failed to take an image data sufficient to detect the characteristic points can be warned by a sound or the like to take a new image again.

Position calculator 52 includes attitude calculator 521 for calculating the rotational parameters of the given rectangular plane in a space (defined by X-Y-Z coordinate) relative to the image sensing plane and coordinate calculator 522 for calculating the coordinate of the target point on the rectangular plane.

FIG. 3 represents a detailed block diagram of attitude calculator 521, which includes vanishing point processor 523, coordinate converter 5214 and perspective projection converter 5215. Vanishing point processor 523 includes vanishing point calculator 5211, vanishing line calculator 5212 and vanishing characteristic point calculator 5213 for finally getting the vanishing characteristic points on the basis of the vanishing points calculated on the coordinate of the plurality of characteristic points on the image sensing plane, Perspective projection converter 5215 is for finally calculating the rotational parameters.

In FIG. 4, light beam emitter 6A made of semiconductor laser is a source of light beam to be transmitted toward the rectangular plane for visually pointing the target point on the plane such as in a conventional laser pointer used in a presentation or a meeting. As an alternative of light beam emitter 6A, a light emitting diode is available.

Figure 5:
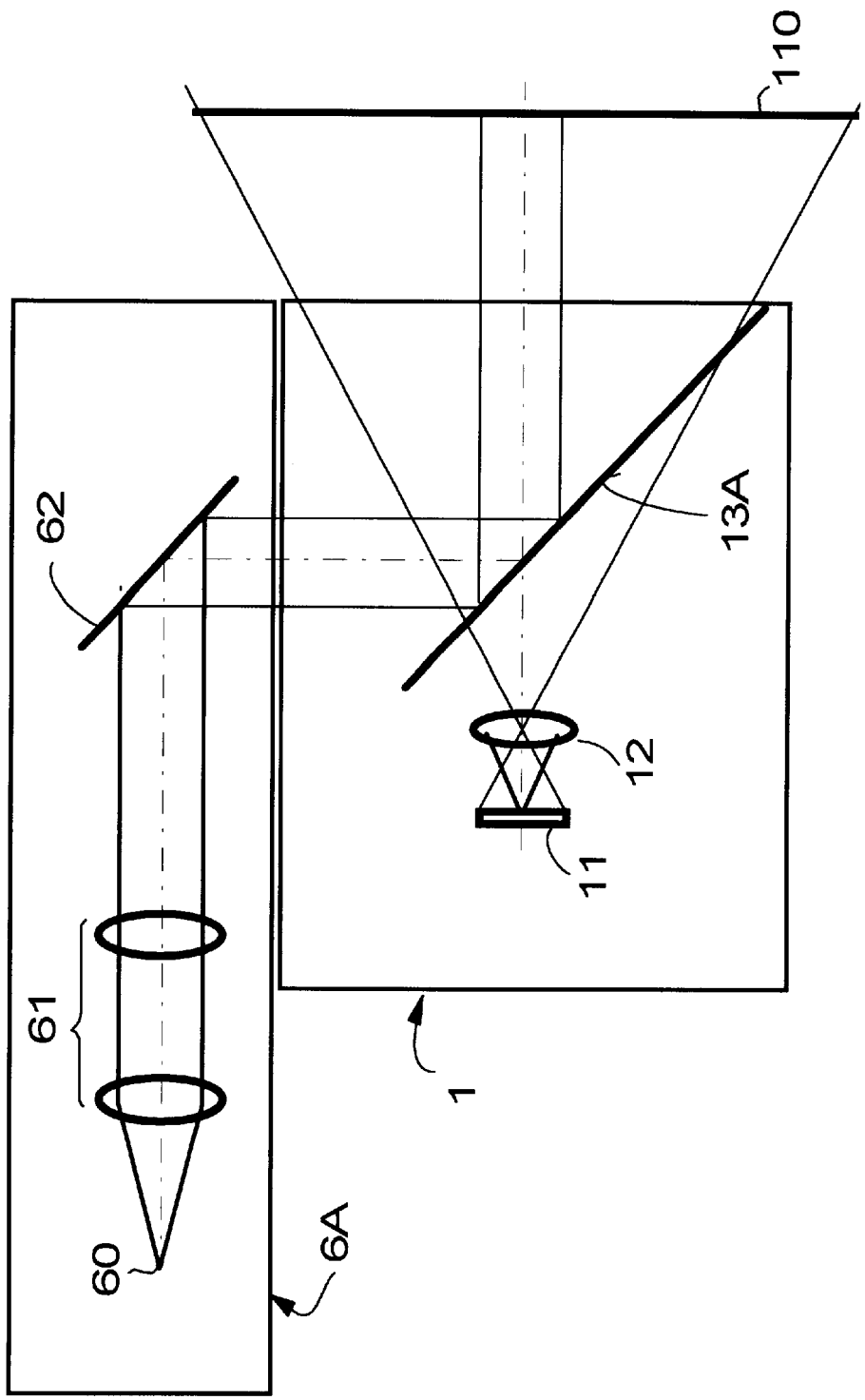
FIG. 5 represents a cross sectional view of the optical system of main body in FIG. 4.

FIG. 5 shows a cross sectional view of the optical system of main body 100 in FIG. 4. If a power switch is made on, the laser beam is emitted at light source point 60 and collimated by collimator 61 to advance on the optical axis of camera 1 toward rectangular plane 110 by way of mirror 62 and semitransparent mirror 13A. Camera 1 includes objective lens 12 and CCD 11 for sensing image through semitransparent mirror 13A, the power switch of the laser being made off when the image is sensed by camera 1. Therefore, mirror 13A may alternatively be a full refractive mirror, which is retractable from the optical axis when the image is sensed by camera 1.

In this Embodiment 1, the position of beam emitter 6A is predetermined relatively to camera 1 so that the path of laser beam from beam emitter 6A coincides with the optical axis of camera 1. By this arrangement, a point on the rectangular plane 110 which is lit by the laser beam coincides with a predetermined point, such as the center, on the image sensing plane of CCD 11. Thus, if the image is sensed by camera 1 with the laser beam aimed at the target point, the target point is sensed at the predetermined point on the image sensing plane of CCD 11. The laser beam is only help for this purpose. Therefore, the position of light beam emitter 6A relative to camera 1 may alternatively predetermined so that the path of laser beam from beam emitter 6A runs in parallel with the optical axis of camera 1 with mirrors 62 and 13A removed. In this case, the difference between the path of laser beam and the optical axis of camera 1 can be corrected in the course of calculation. Or, the difference may be in some case negligible.

In FIG. 2, power switch 7 for light beam emitter 6A and shutter release switch 8 are controlled by a dual step button, in which power switch 7 is turned on with a depression of the dual step button to the first step. If the depression is quitted at the first step, power switch 7 is simply turned off. On the contrary, if the dual step button is further depressed to the second step, shutter release switch 8 is turned on to sense the image, the power switch 7 being turned off in the second step of the dual step button.

Output signal processor 9 converts the attitude data or the coordinate data calculated by position calculator 52 into output signal for displaying the output signal as a numeral data with the taken image on the main body or for forwarding the output signal to the peripheral apparatus, such as a video projector or a computer. By means of transmitting the output signal with a wireless signal transmitter adopted in output signal processor 9, the system will be still more conveniently used.

Figure 6:
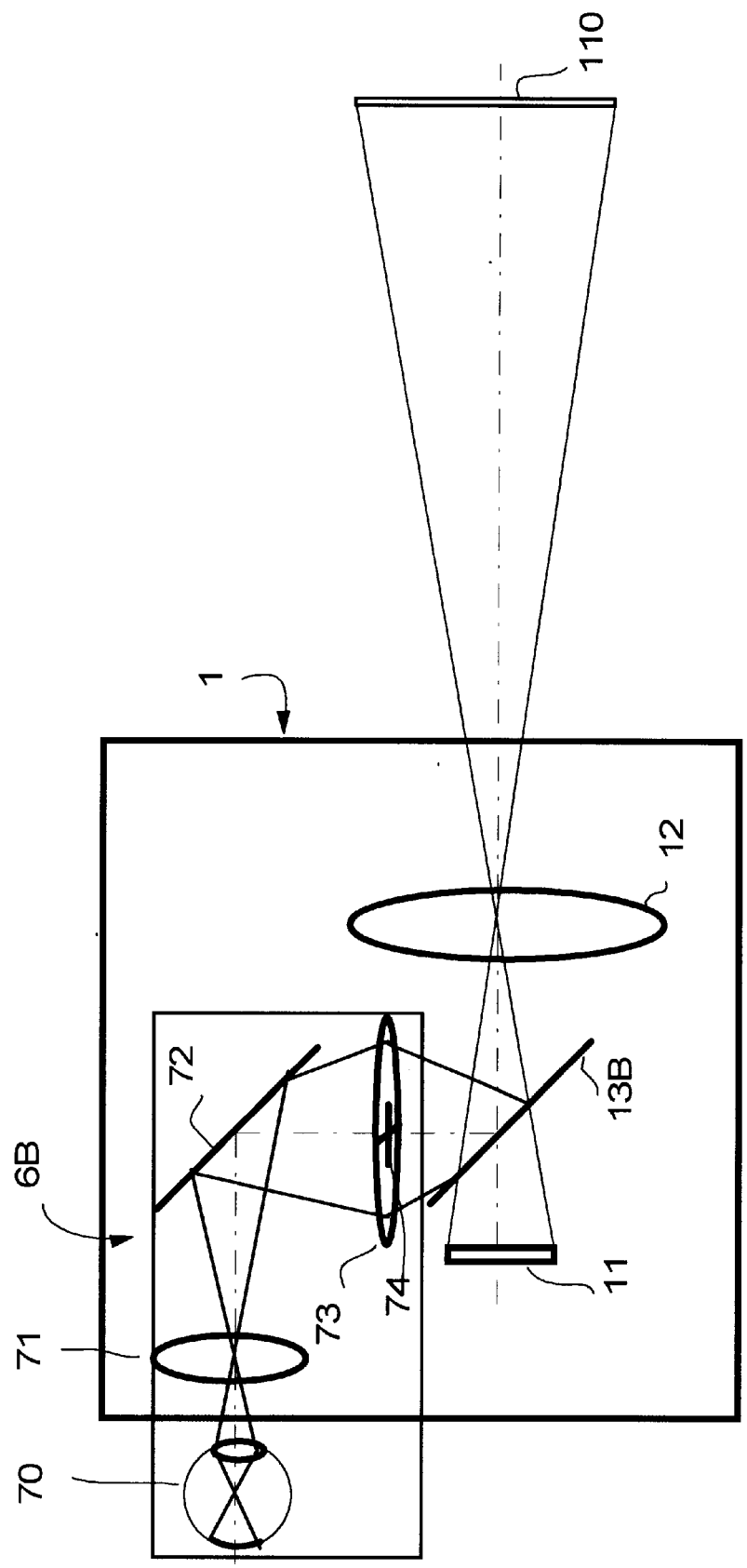
FIG. 6 represents a cross sectional view of a modification of the optical system.

In FIG. 6, optical finder 6B is shown, which can replace light bean emitter 6A for the purpose of aiming the target point so that the target point is sensed at the predetermined point on the image sensing plane of CCD 11.

Optical finder 6B includes focal plane 73 which is made optically equivalent to the image sensing plane of CCD 11 by means of half mirror 13B. Cross 74 is positioned on focal plane 73, cross 74 being optically equivalent to the predetermined point on the image sensing plane of CCD 11. Human eye 70 observes both cross 74 and the image of rectangular plane 110 on focal plane 73 by way of eyepiece 71 and mirror 72. Thus, if the image is sensed by camera 1 with cross 74 located at the image of the target point on focal plane 73, the target point is sensed at the predetermined point on the image sensing plane of CCD 11.

If rectangular plane 110 is an image projected by a video projector controlled by a computer, for example, light beam emitter 6A or optical finder 6B may be omitted. In this case, the output signal is forwarded from the output signal processor 9 to the computer, and the calculated position is displayed on the screen as a cursor or the like under the control of the computer. Thus, the point which has been sensed at the predetermined point of the image sensing plane of CCD 11 is fed back to a user who is viewing the screen. Therefore, if the image taking, the calculation and the feed back displaying functions will be repeated successively, the user can finally locate the cursor at the target point on the screen.

Similarly, in the case that the given rectangular plane is a monitor of a personal computer, user can control the cursor on the monitor from any place remote form the computer by means of the system according to the present invention.

In Embodiment 1 above, camera 1 and image processor 5 are integrated as a one body as in FIG. 4. Image processor 5 may, however, be separated from camera 1, and be located as a software function in the memory of a peripheral device such as a computer.

Figure 7:
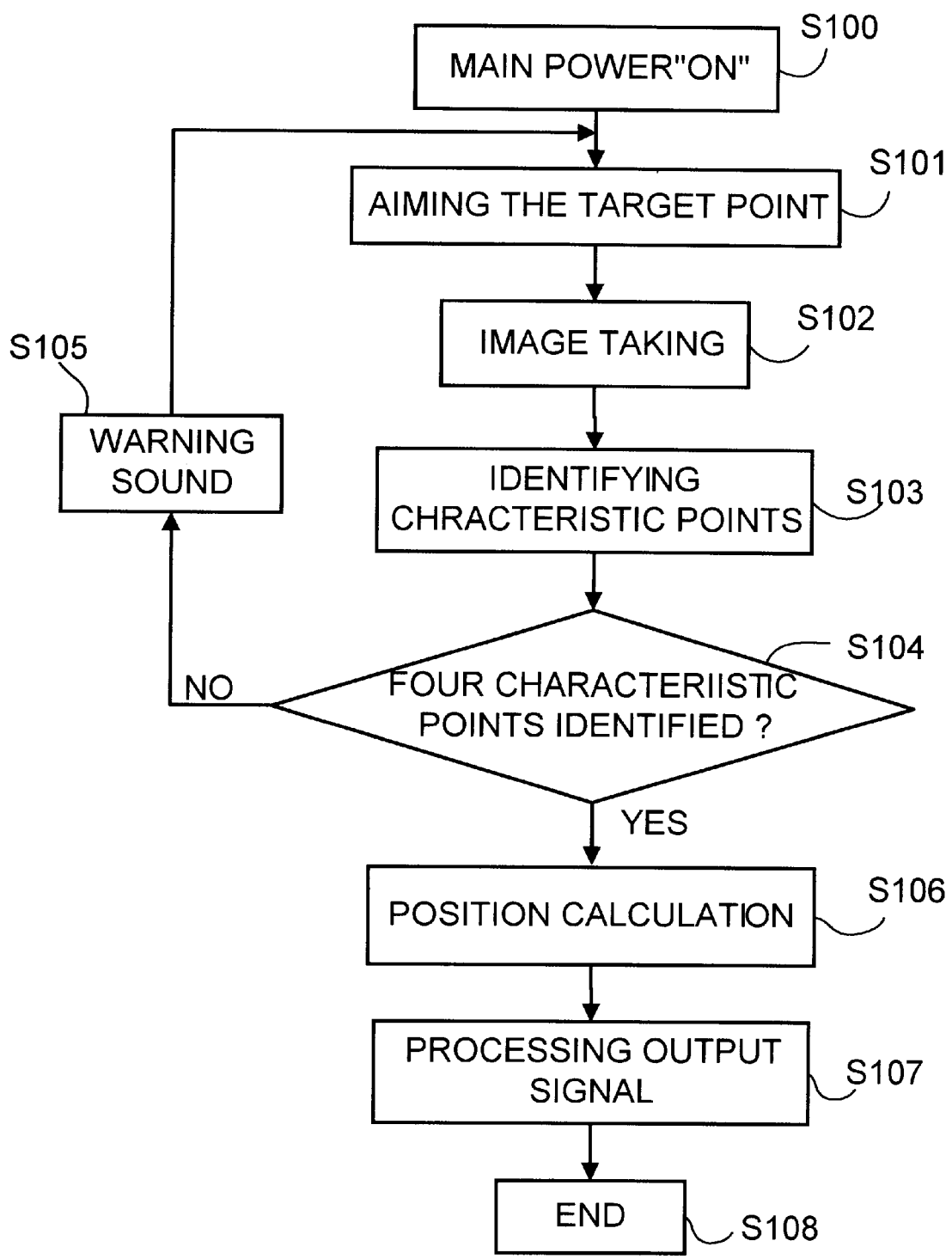
FIG. 7 represents a flow chart for the basic function of Embodiment 1 according to the present invention.

FIG. 7 represents a flow chart for the basic function of Embodiment 1 according to the present invention. In step S100, the main power of the system is turned on. In step S101, the target point on a given plane having the plurality of characteristic points is aimed so that the target point is sensed at the predetermined point on the image sensing plane of CCD 11. According to Embodiment 1, the predetermined point is specifically the center of image sensing plane of CCD 11 at which the optical axis of the objective lens of camera 1 intersects.

In step 102, the image is taken in response to shutter switch 8 of the camera 1 with the image of the target point at the predetermined point on the image sensing plane of CCD 11, then the image signal being stored in the frame memory by way of necessary signal processing following the image taking function.

In step S103, the characteristic points defining the rectangular plane are identified, each of the characteristic points being the center of gravity of each of predetermined marks, respectively. The characteristic points are represented by coordinate q1, q2, q3 and q4 on the basis of image sensing plane coordinate. In step 104, it is tested whether the desired four characteristic points are successfully and accurately identified. If the answer is "No", a warning sound is generated in step S105 to prompt the user to take an image again. On the other hand, if the answer is "Yes", the flow advances to step S106.

Step S106 is for processing the rotational parameters of the given rectangular plane in a space relative to the image sensing plane and the coordinate of the target point on the rectangular plane, which will be explained later in detail. In step S107, the calculated data is converted into output signal for display (not shown) or transmission to the peripheral apparatus. Then, the flow will be ended in step S108.

Now, the description will be advanced to the detailed functions of image processor 5 of Embodiment 1.

(A) Characteristic Point Detection

Various types of characteristic point detector are possible according to the present invention.

For example, in the case that the given rectangular plane is an image projected on a screen by a projector, the characteristic points are the four corners Q1, Q2, Q3 and Q4 of a rectangular image projected on a screen as in FIG. 1. The image is to be taken with all the four corners covered within the image sensing plain of the camera. For the purpose of detecting the corners without fail in various situations, the projector is arranged to alternately projects a bright and dark images and the camera is released twice in synchronism with the alternation to take the bright and dark images Thus, the corners are detected by the difference between the bright and dark images to finally get the binary picture. According to Embodiment 1 in FIG. 2, characteristic point detector 51 includes difference calculator 511, binary picture processor 512 and characteristic point coordinate identifier 513 for this purpose.

Alternatively, at least four marks may be projected within an image on the screen to define a new rectangular inside the image projected on the screen, each of the characteristic points being calculated as the center of gravity of each of marks. Also in this case, the projector is arranged to alternately projects two images with and without the marks, and the camera is released twice in synchronism with the alternation to take the two images. Thus, the marks are detected by the difference between the two images to finally get the binary picture.

The characteristic points may be detected by an edge detection method or a pattern matching method. In the pattern matching method, the reference image data may previously stored in memory of the system to be compared with a taken image.

(B) Position Calculation

Position calculator calculates a coordinate of a target point Ps on a given rectangular plane defined by characteristic points, the given rectangular plane being located in a space.

Figure 8:
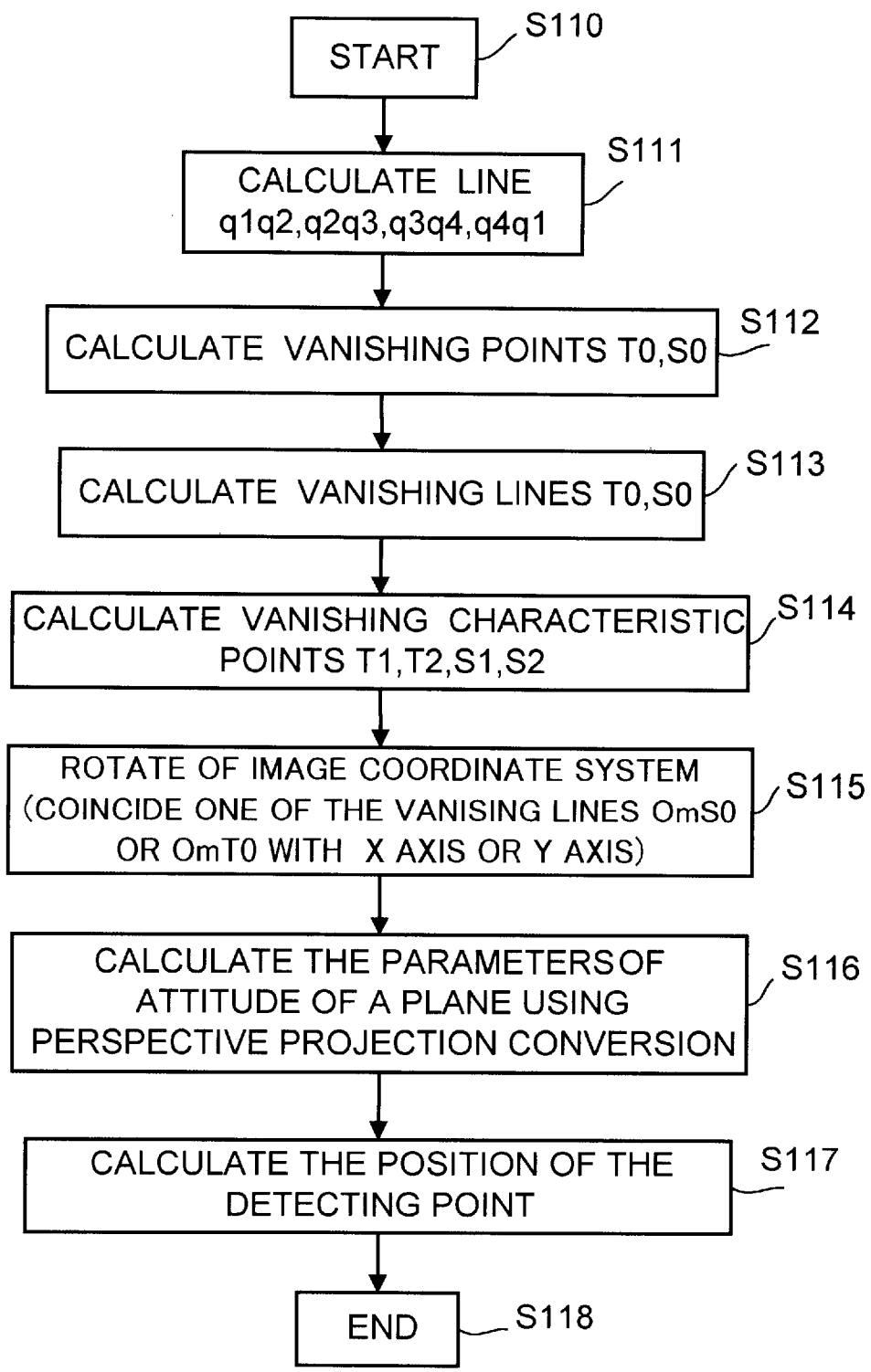
FIG. 8 represents a flow chart of the manner of calculating the coordinate of the target point and corresponds to the details of step 106 in FIG. 7.

FIG. 8 show the manner of calculating the coordinate of the target point and corresponds to the details of step 106 in FIG. 7.

Figure 9:
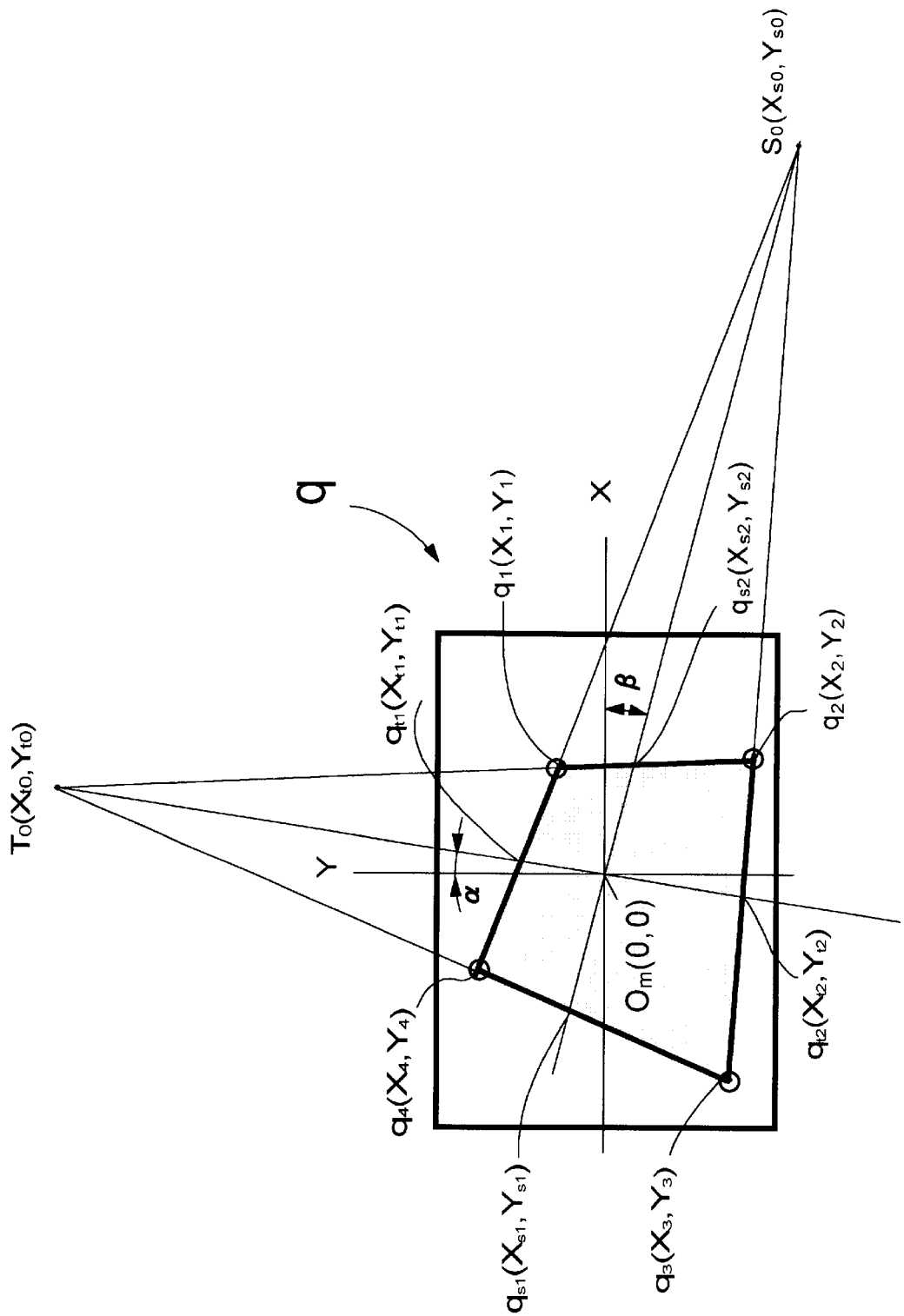
FIG. 9 represents an image taken by the main body, in which the image of target point is within the rectangular shape defined by the four characteristic points.
Figure 10:
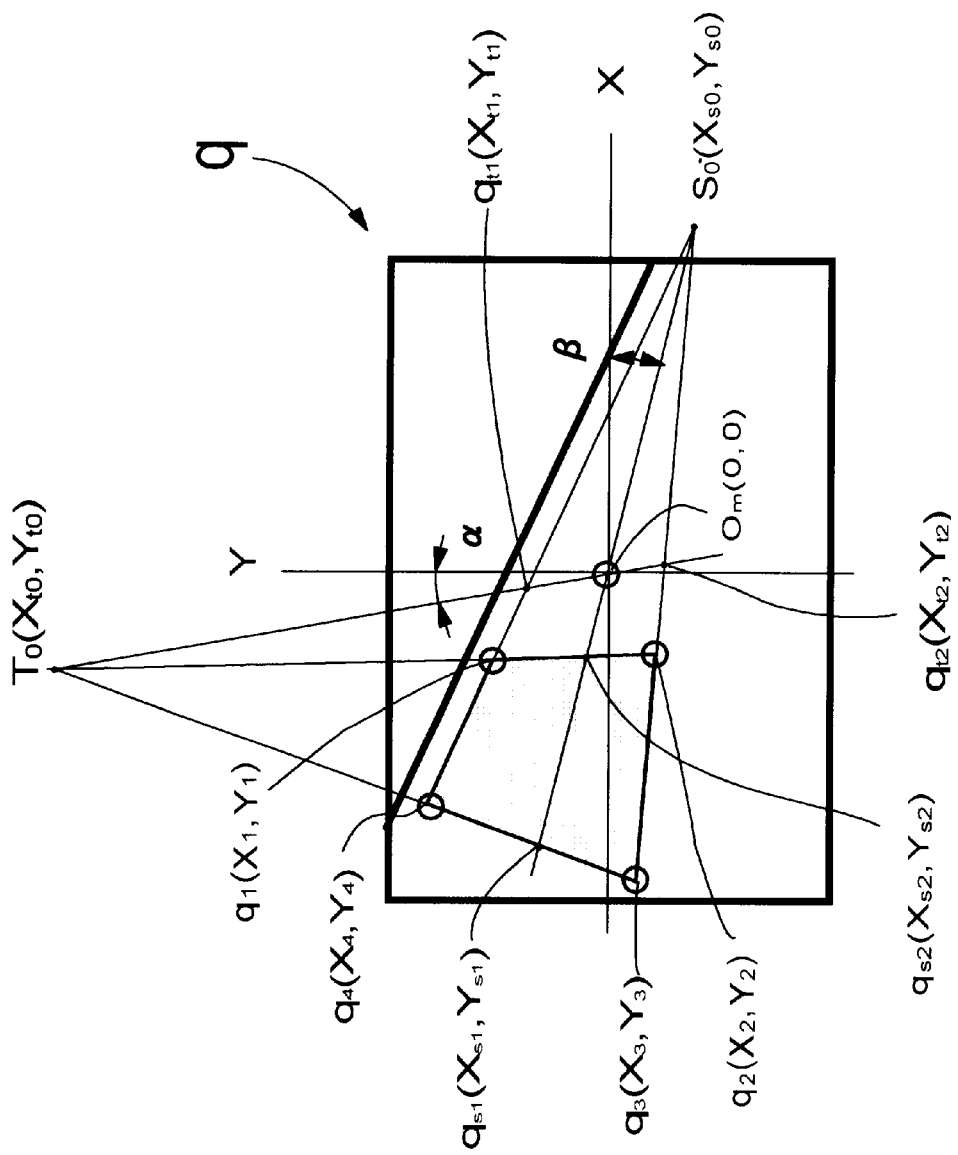
FIG. 10 represents another type of image taken by the main body, in which the image target point is outside the rectangular shape defined by the four characteristic points.

FIGS. 9 and 10 represent two types of image q taken by main body 100 from different position relative to the rectangular plane, respectively. In FIGS. 9 and 10, the image of target point Ps is in coincidence with predetermined point Om, which is the origin of the image coordinate. Characteristic points q1, q2, q3 and q4 are the images on the image sensing plane of the original of characteristic points Q1, Q2, Q3 and Q4 on the rectangular plane represented by X*-Y* coordinate.

In FIG. 9, the image of target point at predeternmined point Om is within the rectangular shape defined by the four characteristic points q1, q2, q3 and q4, while the image of target point at predetermined point Om is outside the rectangular shape defined by the four characteristic points q1, q2, q3 and q4 in FIG. 10.

(b1) Attitude Calculation

Figure 11:
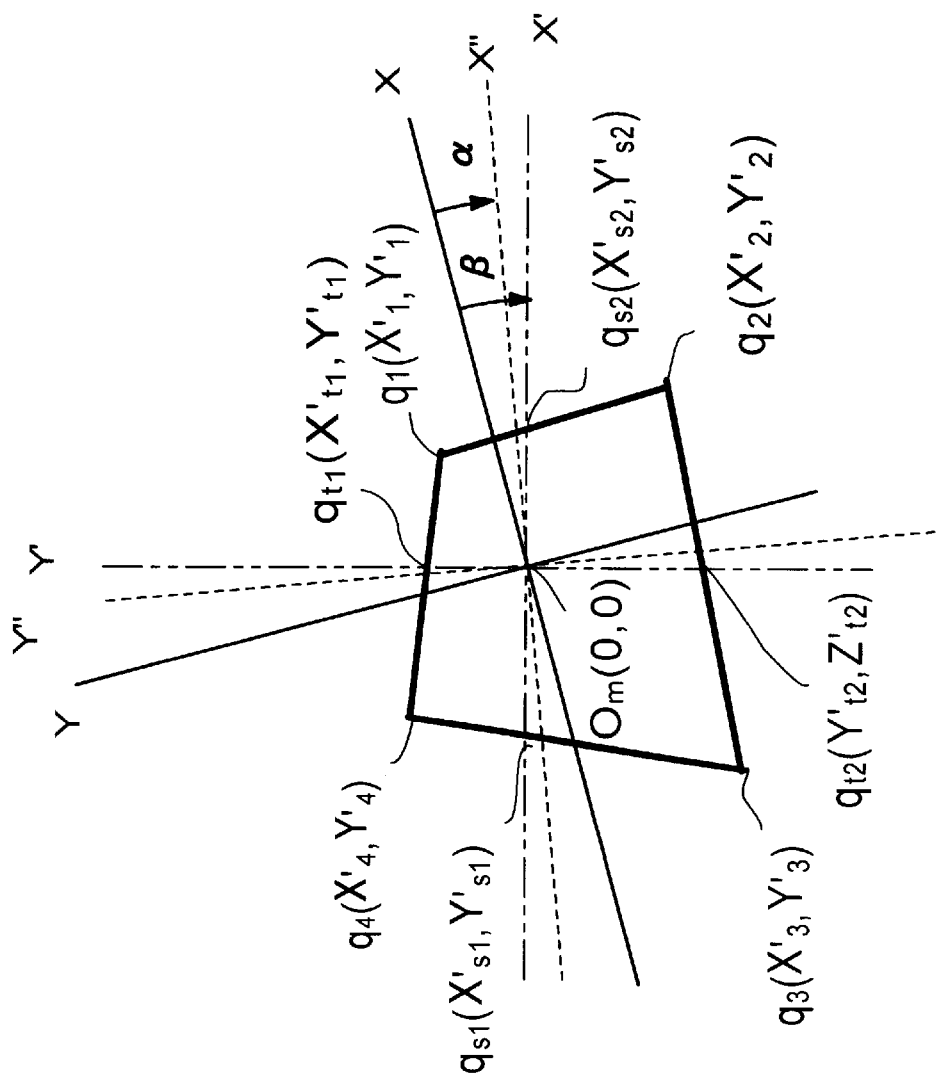
FIG. 11 represents an image under the coordinate conversion from X-Y coordinate to X'-Y' coordinate.

Now, the attitude calculation, which is the first step of position calculation, is to be explained in conjugation with the flow chart in FIG. 8, the block diagram in FIG. 3 and image graphs in FIGS. 9 to 11. The parameters for defining the attitude of the given plane with respect to the image sensing plane are rotation angle $\gamma$ around X-axis, rotation angle $\phi$ around Y-axis, and rotation angle $\alpha$ or $\beta$ around Z-axis.

Referring to FIG. 8, linear equations for lines q1q2, q2q3, q3q4 and q4q1 are calculated on the basis of coordinates for detected characteristic points q1, q2, q3 and q4 in step S111, lines q1q2, q2q3, q3q4 and q4q1 being defined between neighboring pairs among characteristic points q1, q2, q3 and q4, respectively. In step S112, vanishing points T0 and S0 are calculated on the basis of the liner equations. Steps 111 and 112 correspond to the function of vanishing point calculator 5211 of the block diagram in FIG. 3.

The vanishing points defined above exists in the image without fail if a rectangular plane is taken by a camera. The vanishing point is a converging point of lines. If lines q1q2 and q3q4 are completely parallel with each other, the vanishing point exists in infinity.

According to Embodiment 1, the plane located in a space is a rectangular having two pairs of parallel lines, which cause two vanishing points on the image sensing plane, one vanishing point approximately on the direction along the X-axis, and the other along the Y-axis.

In FIG. 9, the vanishing point approximately on the direction along the X-axis is denoted with S0, and the other along the Y-axis with T0. Vanishing point T0 is an intersection of lines q1q2 and q3q4.

In step S113, linear vanishing lines OmS0 and OmT0, which are defined between vanishing points and origin Om, are calculated. This function in Step 113 corresponds to the function of vanishing line calculator 5212 of the block diagram in FIG. 3.

Further in step S113, vanishing characteristic points qs1, qs2, qt1 and qt2, which are intersections between vanishing lines OmS0 and OmT0 and lines q3q4, q1q2, q4q1 and q2q3, respectively, are calculated. This function in Step 113 corresponds to the function of vanishing characteristic point calculator 5213 of the block diagram in FIG. 3.

The coordinates of the vanishing characteristic points are denoted with qs1(Xs1,Ys1), qs2(Xs2,Ys2), qt1(Xt1,Yt1) and qt2(Xt2,Yt2). Line qt1qt2 and qs1qs2 defined between the vanishing characteristic points, respectively, will be called vanishing lines as well as OmS0 and OmT0.

Vanishing lines qt1qt2 and qs1qs2 are necessary to calculate target point Ps on the given rectangular plane. In other words, vanishing characteristic points qt1, qt2, qs1 and qs2 on the image coordinate (X-Y coordinate) correspond to points T1, T2, S1 and S2 on the plane coordinate (X*-Y* coordinate) in FIG. 1, respectively.

If the vanishing point is detected in infinity along X-axis of the image coordinate in step S112, the vanishing line is considered to be in parallel with X-axis.

In step 114, image coordinate (X-Y coordinate) is converted into X'-Y' coordinate by rotating the coordinate by angle $\beta$ around origin Om so that X-axis coincides with vanishing line OmS0. Alternatively, image coordinate (X-Y coordinate) may be converted into X"-Y" coordinate by rotating the coordinate by angle $\alpha$ around origin Om so that Y-axis coincides with vanishing line OmT0. Only one of the coordinate conversions is necessary according to Embodiment 1. (Step S114 corresponds to the function of coordinate converter 5214 in FIG. 3.)

FIG. 11 is to explain the coordinate conversion from X-Y coordinate to X'-Y' coordinate by rotation by angle $\beta$ around origin Om with the clockwise direction is positive. FIG. 11 also explains the alternative case of coordinate conversion from X-Y coordinate to X"-Y" coordinate by rotating the coordinate by angle $\alpha$.

The coordinate conversion corresponds to a rotation around Z-axis of a space (X-Y-Z coordinate) to determine one of the parameters defining the attitude of the given rectangular in the space.

By means of the coincidence of vanishing line qs1qs2 with X-axis, lines Q1Q2 and Q3Q4 are made in parallel with X-axis.

In step S115, characteristic points q1, q2, q3 and q4 and vanishing characteristic points qt1, qt2, qt3 and qt4 on the new image coordinate (X'-Y' coordinate) are related to characteristic points Q1, Q2, Q3 and Q4 and points T1, T2, S1 and S2 on the plane coordinate (X*-Y* coordinate). This is performed by perspective projection conversion according to the geometry. By means of the perspective projection conversion, the attitude of the given rectangular plane in the space (X-Y-Z coordinate) on the basis of the image sensing plane is calculated. In other words, the pair of parameters, angle φ around Y-axis and γ around X-axis for defining the attitude of the given rectangular plane are calculated. The perspective projection conversion will be discussed in detail in the following subsection (b11). (Step S115 corresponds to the function of perspective projection converter 5215 in FIG. 3.)

In step S116, the coordinate of target point Ps on the plane coordinate (X*-Y* coordinate) is calculated on the basis of the parameters gotten in step S115. The details of the calculation to get the coordinate of target point Ps will be discussed later in section (b2).

(b11) Perspective Projection Conversion

Perspective projection conversion is for calculating the parameters (angles φ and angle γ) for defining the attitude of the given rectangular plane relative to the image sensing plane on the basis of the four characteristic points identified on image coordinate (X-Y coordinate).

Figure 12:
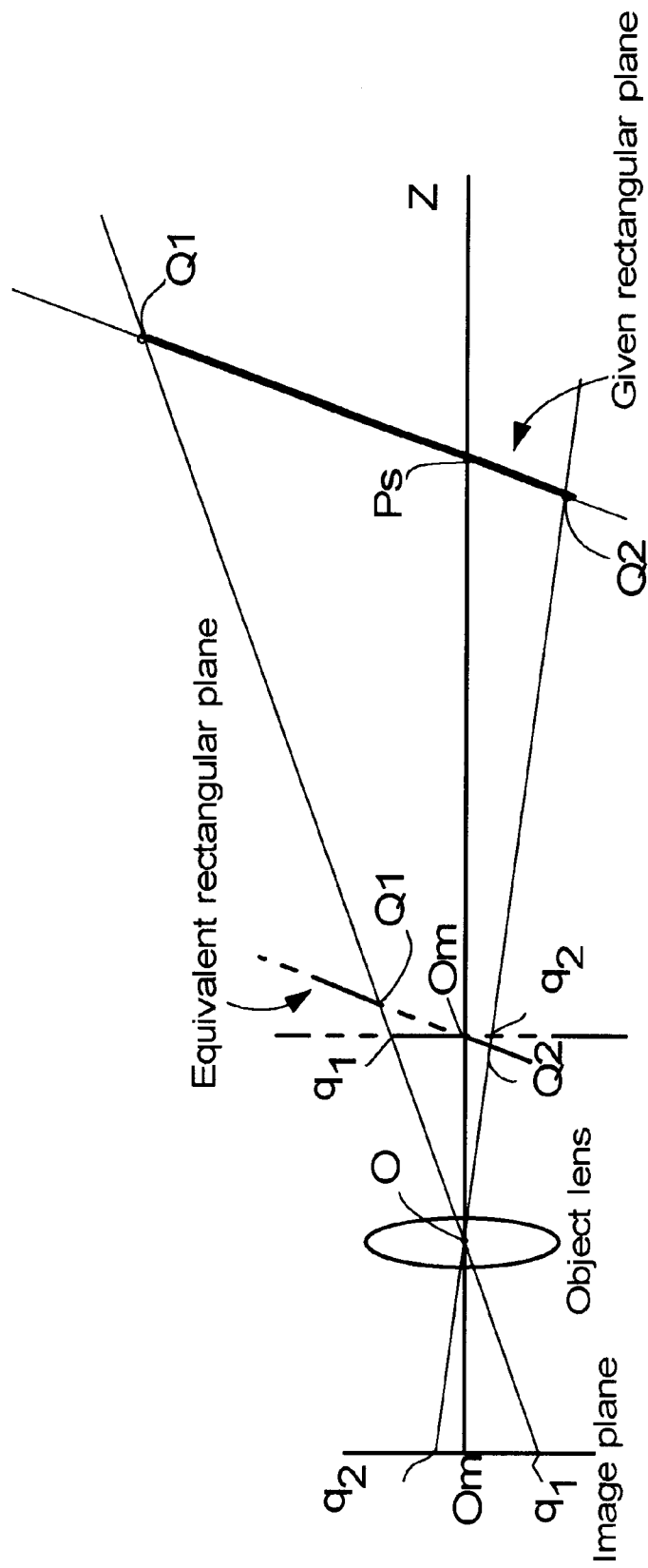
FIG. 12 represents a two-dimensional graph for explaining the basic relationship among various planes in the perspective projection conversion.

FIG. 12 explains the basic relationship among various planes in the perspective projection conversion, the relationship being shown in two-dimensional manner for the purpose of simplification. According to FIG. 12, a real image of the given rectangular plane is formed on the image sensing plane by the objective lens of the camera. The equivalent image sensing plane denoted by a chain line is shown on the object side of the objective lens at the same distance from the objective lens as that of the image sensing plane form the objective lens, the origin Om and points q1 and q2 being also used in the X-Y coordinate of the equivalent image sensing plane denoted by the chain line. The equivalent rectangular plane denoted by a chain line is also set by shifting the given rectangular plane toward the object side so that target point Ps coincides with the origin Om with the equivalent rectangular plane kept in parallel with the given rectangular plane. The points Q1 and Q2 are also used in the equivalent rectangular plane. In this manner, the relationship between the image sensing plane and the given rectangular plane are viewed at origin Om of the equivalent image sensing plane as if viewed from the center O of the objective lens, which is the view point of the perspective projection conversion.

Figure 13:
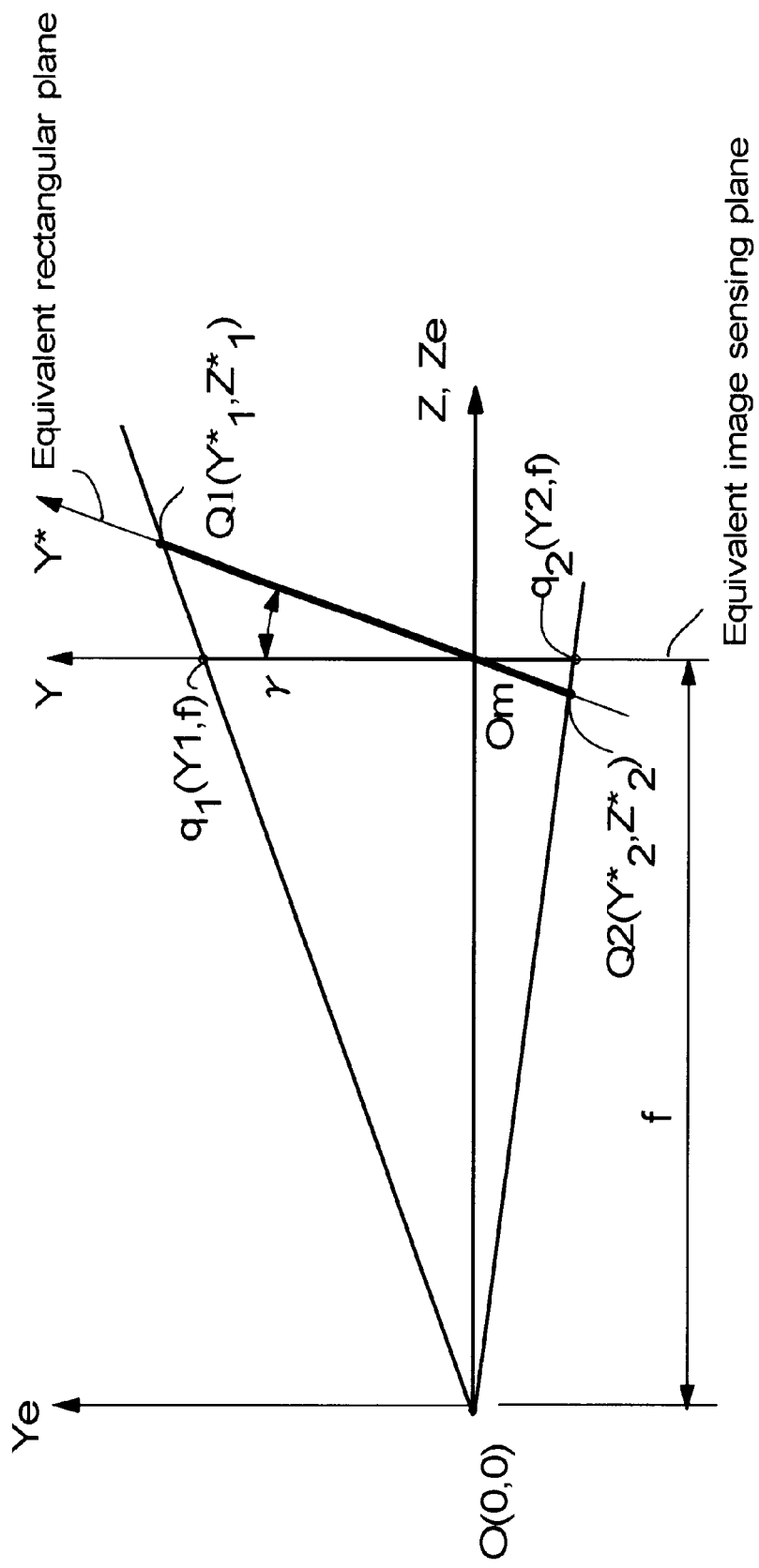
FIG. 13 represents a two-dimensional graph of only the equivalent image sensing plane and the equivalent rectangular plane with respect to the eye.

FIG. 13 shows only the equivalent image sensing plane and the equivalent rectangular plane with respect to view point O. The relationship is shown on the basis of Ye-Ze coordinate with its origin defined at view point O, in which the equivalent image sensing plane on X-Y coordinate and the given rectangular plane on X*-Y* coordinate are shown, Z-axis of the equivalent image sensing plane being in coincidence with Ze-axis. View point O is apart from origin Om of the image coordinate by f, which is equal to the distance from the objective lens to the image sensing plane. Further, the given rectangular plane is inclined by angle γ.

Figure 14:
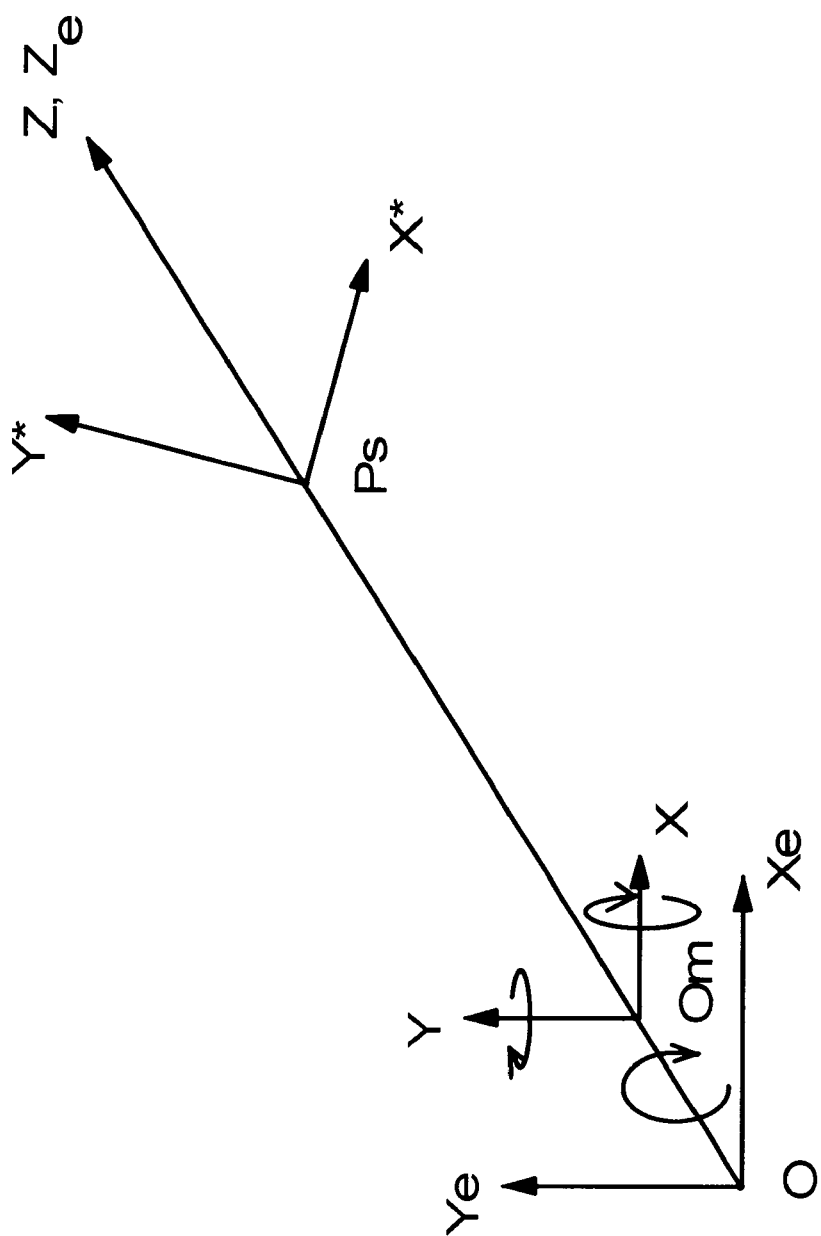
FIG. 14 represents a three-dimensional graph for explaining the spatial relationship between X-Y-Z coordinate representing the equivalent image sensing plane in a space and X*-Y* coordinate representing the given rectangular plane.

FIG. 14 is an explanation of the spatial relationship between X-Y-Z coordinate (hereinafter referred to as "image coordinate") representing the equivalent image sensing plane in a space and X*-Y* coordinate (hereinafter referred to as "plane coordinate") representing the given rectangular plane. Z-axis of image coordinate intersects the center of the equivalent image sensing plain perpendicularly thereto and coincides with the optical axis of the objective lens. View point O for the perspective projection conversion is on Z-axis apart from origin Om of the image coordinate by f. Rotation angle γ around X-axis, rotation angle φ around Y-axis, and two rotation angles α and β both around Z-axis are defined with respect to the image coordinate, the clockwise direction being positive for all the rotation angles. With respect to view point O, Xe-Ye-Ze coordinate is set for perspective projection conversion, Ze-axis being coincident with Z-axis and Xe-axis and Ye-axis being in parallel with which will X-axis and Y-axis, respectively.

Now the perspective projection conversion will be described in detail. According to the geometry on FIG. 13, the relationship between Ye-Ze coordinate of a point such as Q1 on the equivalent rectangular plane and that of a point such as q1 on the equivalent image sensing plane, the points Q1 and q1 being viewed in just the same direction from view point O, can be generally expressed by the following equations (1) and (2)

$$Y^* = \frac{Y \cdot f}{f - Y \tan \gamma} \quad (1)$$

$$Z^* = \frac{f^2}{f - Y \tan \gamma} \quad (2)$$

Therefore, characteristic points Qi(Y*i, Z*i), wherein i is an integer, will be given by the following equations (3) and (4)

$$Q_1(Y_1^*, Z_1^*) = \left[ \frac{Y_1 \cdot f}{f - Y_1 \tan \gamma}, \frac{f^2}{f - Y_1 \tan \gamma} \right] \quad (3)$$

$$Q_2(Y_2^*, Z_2^*) = \left[ \frac{Y_2 \cdot f}{f - Y_2 \tan \gamma}, \frac{f^2}{f - Y_2 \tan \gamma} \right] \quad (4)$$

FIG. 14 shows the perspective projection conversion in three-dimensional manner for calculating the attitude of the rectangular plane given in a space (X-Y-Z coordinate) relative to the image sensing plane. Hereinafter the equivalent image sensing plane and the equivalent rectangular plane will be simply referred to as "image sensing plane" and "given rectangular plane", respectively.

The given rectangular plane is rotated around Z-axis, which is equal to Z'-axis, by angle β in FIG. 14 so that Y'-axis is made in parallel with Ye-axis not shown.

Figure 15:
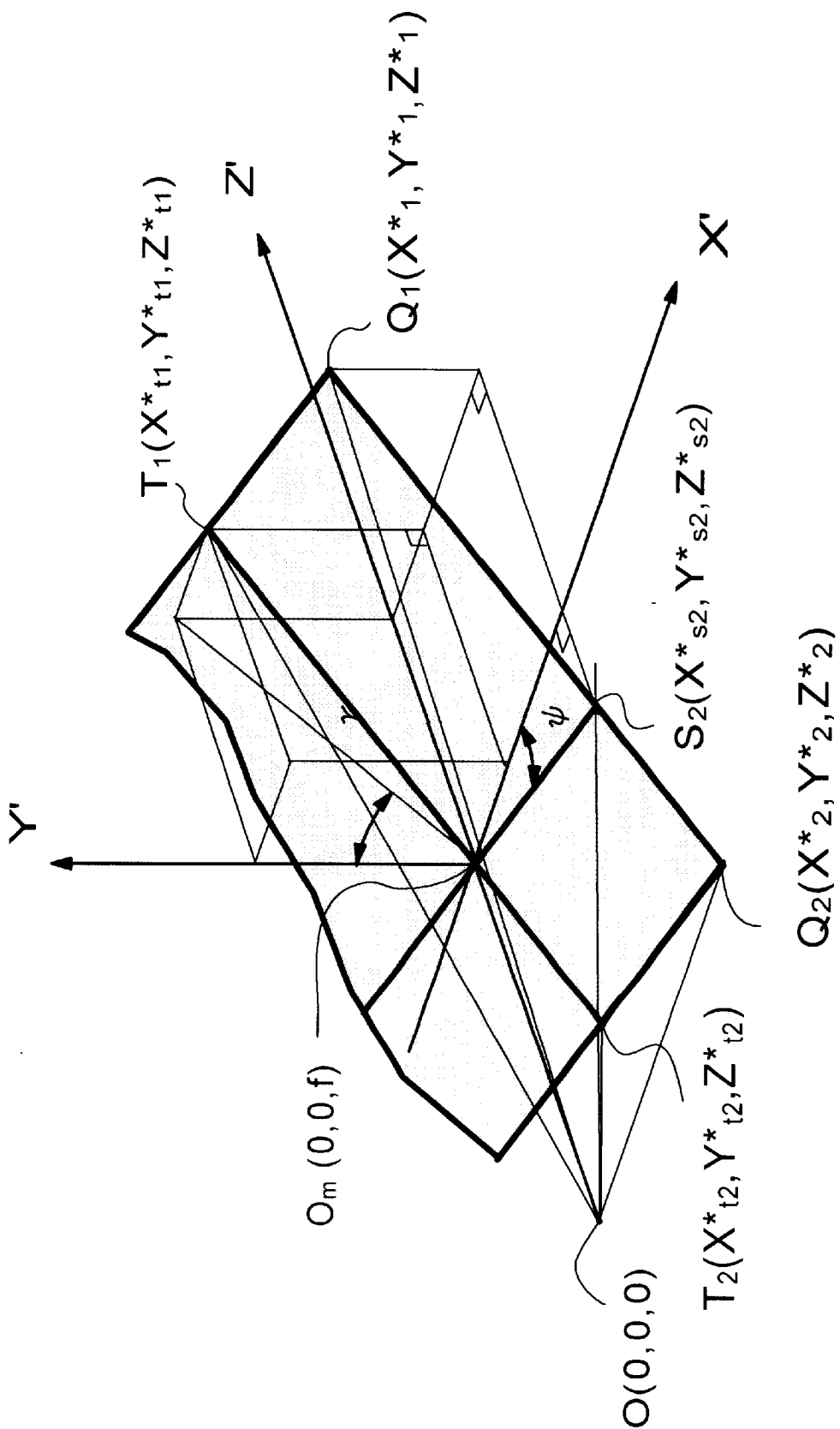
FIG. 15 represents a three-dimensional graph showing a half of the given rectangular plane with characteristic points Q1 and Q2.

In FIG. 15, a half of the given rectangular plane is shown with characteristic points Q1(X*1, Y*1, Z*1) and Q2(X*2, Y*2, Z*2). Points T1(X*t1, Y*t1, Z*t1) T2(X*t2, Y*t2, Z*t2) and S2(X*s2, Y*s2, Z*s2) are also shown in FIG. 15. The remaining half of the given rectangular plane and the points such as Q3, Q4 and S1 are omitted from FIG. 15. Further, there are shown in FIG. 15 origin Om(0,0,f) coincident with target point Ps and view point O(0,0,0), which is the origin of Xe-Ye-Ze coordinate.

Line T1Om is on Y'-Z' plane and rotated by angel γ around X'-axis, while line S2Om is on X'-Z' plane and rotated by angel φ around Y' -axis, the clockwise directions of rotation being positive, respectively. The coordinates of Q1, Q2, T1, T2 and S2 can be calculated on the basis of the coordinates of q1, q2, qt1, qt2 and qs2 through the perspective projection conversion.

Figure 16:
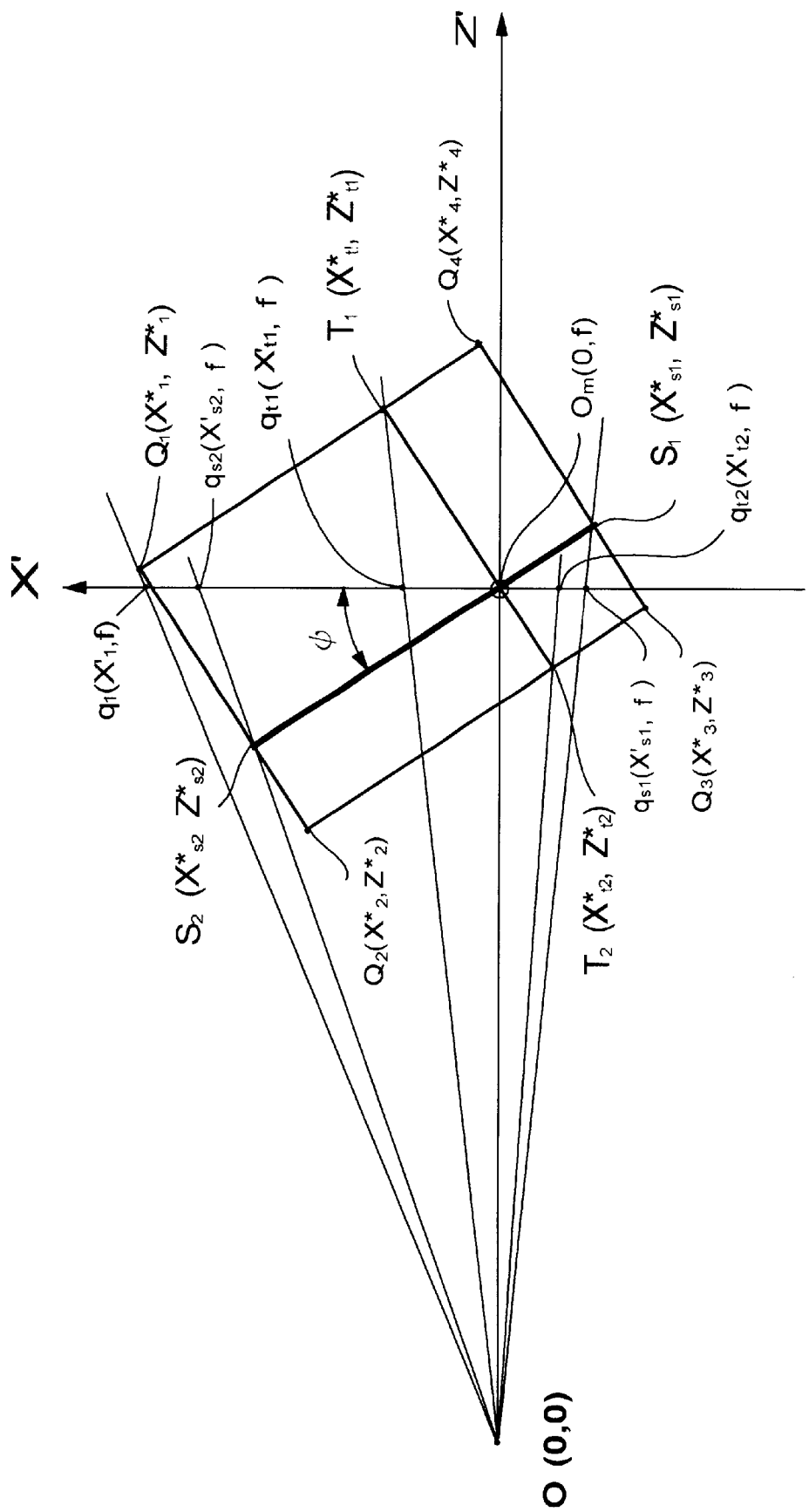
FIG. 16 represents a two-dimensional graph of an orthogonal projection of the three-dimensional rectangular plane in FIG. 15 onto X'-Z' plane.

FIG. 16 represents a two-dimensional graph showing an orthogonal projection of the three-dimensional rectangular plane in FIG. 15 onto X'-Z' plane in which Y'=0. In FIG. 16, only line S1S2 denoted by the thick line is really on X'-Z' plane, while the other lines on the rectangular plane are on the X'-Z' plane through the orthogonal projection.

According to FIG. 16, the X'-Z' coordinates of T1(X*t1, Z*t1), T2(X*t2,Z*t2), S1(X*s1,Z*s1), S2(X*s2,Z*s2) and Q1(X*1,Z*1) can be geometrically calculated on the basis of the X'-Z' coordinates of qt1(X't1,f), qt2(X't2,f), qs1(X's1, f), qs2(X's2,f) and q1(X'1,f) and angle φ as in the following equations (5) to (9):

$$T_1(X_{t1}^*, Z_{t1}^*) = \left[ \frac{X_{t1}' \cdot f \cdot \tan\psi}{f \cdot \tan\psi - X_{t1}'}, \frac{f^2 \cdot \tan\psi}{f \cdot \tan\psi - X_{t1}'} \right] \quad (5)$$

$$T_2(X_{t2}^*, Z_{t2}^*) = \left[ \frac{X_{t2}' \cdot f \cdot \tan\psi}{f \cdot \tan\psi - X_{t2}'}, \frac{f^2 \cdot \tan\psi}{f \cdot \tan\psi - X_{t2}'} \right] \quad (6)$$

$$S_1(X_{s1}^*, Z_{s1}^*) = \left[ \frac{f \cdot X_{s1}'}{X_{s1}' \cdot \tan\psi + f}, \frac{f^2}{X_{s1}' \cdot \tan\psi + f} \right] \quad (7)$$

$$S_2(X_{s2}^*, Z_{s2}^*) = \left[ \frac{f \cdot X_{s2}'}{X_{s2}' \cdot \tan\psi + f}, \frac{f^2}{X_{s2}' \cdot \tan\psi + f} \right] \quad (8)$$

$$Q_1(X_1^*, Z_1^*) = \left[ \frac{X_1'}{X_{s2}'} \cdot \frac{f \cdot \tan\psi - X_{s2}'}{f \cdot \tan\psi - X_1'} \cdot X_{s2}^*, \frac{f}{X_{s2}'} \cdot \frac{f \cdot \tan\psi - X_{s2}'}{f \cdot \tan\psi - X_1'} \cdot X_{s2}^* \right] \quad (9)$$

For the purpose of the following discussion, only one of X'-Z' coordinates of the characteristic points Q1 to Q4 is necessary. Equation (9) for Q1 may be replaced by a similar equation for any one of characteristic points Q2 to Q4.

Figure 17:
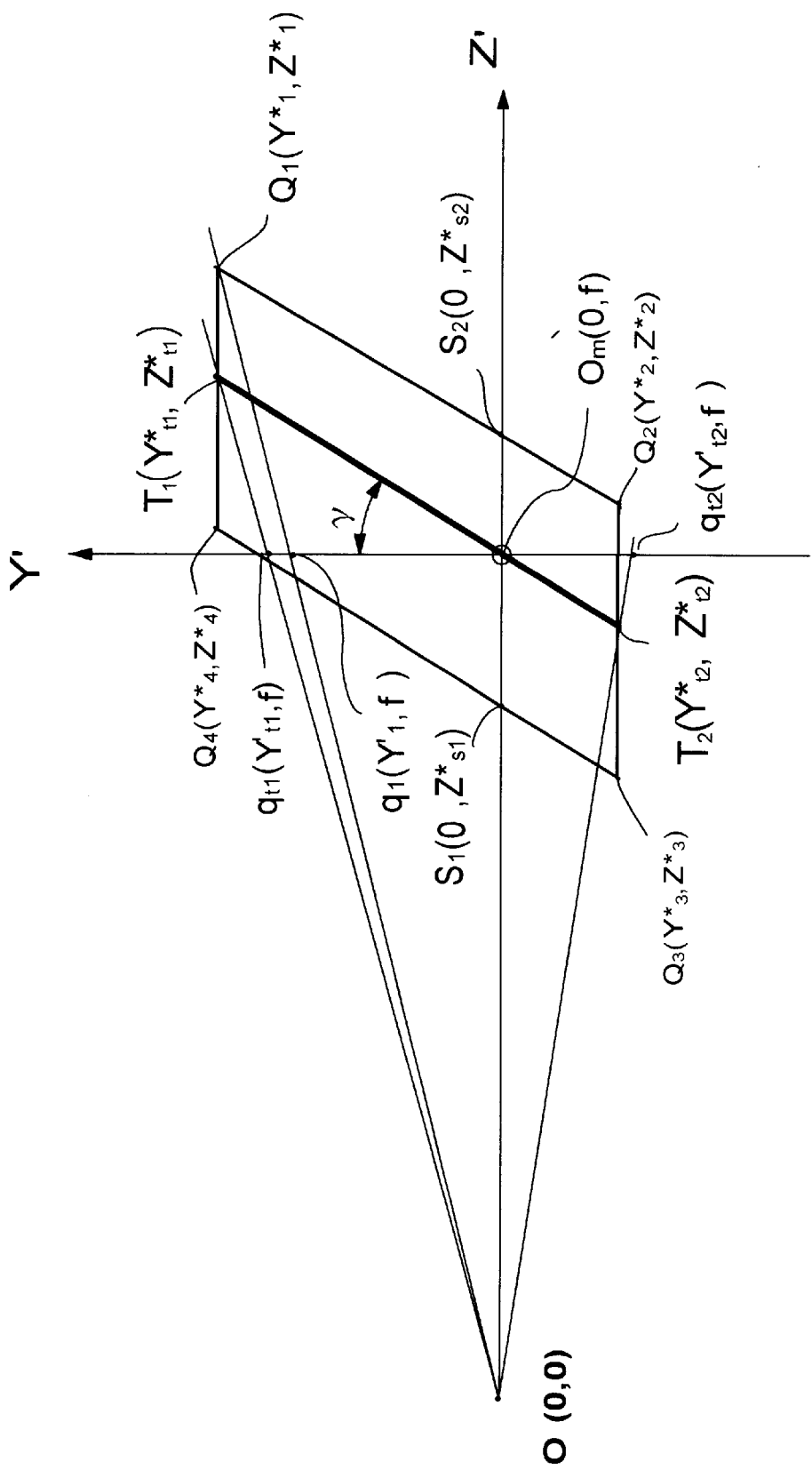
FIG. 17 represents a two-dimensional graph of a orthogonal projection of the three-dimensional rectangular plane in FIG. 15 onto Y'-Z' plane.

On the other hand, FIG. 17 represents a orthogonal projection of the three-dimensional rectangular plane onto Y'-Z' plane in which X'=0. In FIG. 17, only line T1T2 denoted by the thick line is really on Y'-Z' plane, while the other lines on the rectangular plane are on the Y'-Z' plane through the orthogonal projection.

According to FIG. 17, the Y'-Z' coordinates of T1(Y*t1, Z*t1), T2(Y*t2,Z*t2), S1(0,Z*s1), S2(0,Z*s2) and Q1(Y*1, Z*1) can be geometrically calculated on the basis of the Y'-Z' coordinates of qt1(Y't1,f), qt2(Y't2,f), qs1(Y's1,f), qs2(Y's2,f) and q1(Y'1,f) and angle γ as in the following equations (5) to (9):

$$T_1(Y_{t1}^*, Z_{t1}^*) = \left[ \frac{Y_{t1}' \cdot f}{f - Y_{t1}' \tan\gamma}, \frac{f^2}{f - Y_{t1}' \tan\gamma} \right] \quad (10)$$

$$T_2(Y_{t2}^*, Z_{t2}^*) = \left[ \frac{Y_{t2}' \cdot f}{f - Y_{t2}' \tan\gamma}, \frac{f^2}{f - Y_{t2}' \tan\gamma} \right] \quad (11)$$

$$S_1(Y_{s1}^*, Z_{s1}^*) = \left[ 0, \frac{f^2 \cdot \tan\gamma}{Y_{s1}' + f \cdot \tan\gamma} \right] \quad (12)$$

$$S_2(Y_{s2}^*, Z_{s2}^*) = \left[ 0, \frac{f^2 \cdot \tan\gamma}{Y_{s2}' + f \cdot \tan\gamma} \right] \quad (13)$$

$$Q_1(Y_1^*, Z_1^*) = \left[ \frac{Y_1'}{f - Y_1' \cdot \tan\gamma} \cdot Z_{s2}^*, \frac{f}{f - Y_1' \cdot \tan\gamma} \cdot Z_{s2}^* \right] \quad (14)$$

The Y*-coordinate of S1 and S2 in equations (12) and (13) are zero since the X-Y coordinate is rotated around Z axis by angle β so that X-axis coincides with vanishing line S1S2, angle β being one of the parameters for defining the attitude of the given rectangular plane relative to the image sensing plane.

Since the Z*-coordinate of T1 in equation (5) is just the same as that in equation (10), the following equation (15) results:

$$\frac{f^2}{f - Y_{t1}' \cdot \tan\gamma} = \frac{f^2 \cdot \tan\psi}{f \cdot \tan\psi - X_{t1}'} \quad (15)$$

Similarly, the following equation (16) results from equations (9) and (14) both relating to the Z*-coordinate of Q1:

$$\frac{f}{f - Y_1' \cdot \tan\gamma} \cdot Z_{s2}^* = \frac{f}{X_{s2}'} \cdot \frac{f \cdot \tan\psi - X_{s2}'}{f \cdot \tan\psi - X_1'} \cdot X_{s2}^* \quad (16)$$

Equation (15) can be simplified into the following equation (17):

$$\tan\gamma = \frac{1}{\tan\psi} \cdot \frac{X_{t1}'}{Y_{t1}'} \quad (17)$$

And equation (15) can be modified into the following equation (18) by substituting X*s2 and Z*s2 with equation (8), and tan γ with equation (17)

$$\tan\psi = \frac{X_{t1}' X_{s2}' Y_1'}{X_{t1}' Y_1' + X_{s2}' Y_{t1}' - X_1' Y_{t1}'} \cdot \frac{1}{f} \quad (18)$$

Equations (17) and (18) are conclusion of defining angles γ and φ which are the other two of parameters for defining the attitude of the given rectangular plane relative to the image sensing plane. The value for tan γ given by equation (17) can be practically calculated by replacing tan φ by the value calculated through equation (18). Thus, all of the three angles β, γ and φ are obtainable.

As in equations (17) and (18), angles γ and γ are expressed by the coordinate of characteristic point q1(X'1, Y'1) and the coordinate of a vanishing characteristic points qt1(X't1, Y't1) and qs2(X's2) which are calculated on the basis of the coordinates. Distance f in the equation is a known value. Thus, the attitude of the given rectangular plane relative to the image sensing plane can be uniquely determined by the positions of the characteristic points on the image plane.

According to present invention, any complex matrix conversion or the like is not necessary for calculating parameters of the attitude of the given rectangular plane, but such simple form of equations as equations (17) and (18) are sufficient for the same purpose. This leads to various advantages, such as a reduced burden on the calculating function, a less error or high accuracy in calculation and a low cost of the product.

Further, only condition necessary for the calculation according to the present invention is that the characteristic points on the given plane are required to define a rectangle. In other words, any specific information such as the aspect ratio of the rectangle or the relation among the coordinates of the corners of the rectangle is not necessary at all. Further, an information of the distance from the image sensing plane to the given plane is not necessary in the calculation according to the present invention.

Equations (19) and (20) are another forms of conclusion, in which the analysis is made with the counter clockwise rotation around Y-axis defined as positive direction for representing φ on the contrary to equations (17) and (18):

$$\tan\gamma = -\frac{1}{\tan\psi} \cdot \frac{X_{t1}'}{Y_{t1}'} \quad (19)$$

-continued $$\tan\psi = \frac{Y'_1 - Y'_{t1}}{X'_{t1}Y'_1 - X'_1 Y'_{t1}} \cdot f \quad (20)$$

In the case of equations (19) and (20), at least one coordinate of characteristic point q1(X'1, Y'1) at least one coordinate of a vanishing characteristic point qt1(X't1,Y't1) and distance f are only necessary to get angles γ and φ.

Equations (21) and (22) are still another forms of conclusion, in which the analysis is made with the X-Y coordinate rotated around Z axis by angle α so that Y-axis coincides with vanishing line T1T2 on the contrary to equations (17) and (18):

$$\tan\psi = \frac{1}{\tan\gamma} \cdot \frac{X''_{s2}}{Y''_{s2}} \quad (21)$$

$$\tan\gamma = \frac{X''_{s2} - X''_1}{X''_{s2}Y''_1 - X''_{t1}Y''_{s2}} \cdot f \quad (22)$$

(b2) Coordinate Calculation

Now, the coordinate calculation for determining the coordinate of the target point on the given rectangular plane is to be explained. The position of target point Ps on given rectangular plane 110 with the plane coordinate (X*-Y* coordinate) in FIG. 1 is calculated by coordinate calculator 522 in FIG. 2 on the basis of the parameters for defining the attitude of the given rectangular plane obtained by attitude calculator 521.

Referring to FIG. 16, ratio m=OmS1/OmS2 represents the position of Om along the direction in parallel with that of Q3Q2, while ratio n=OmT1/OmT2 represents the position of Om along the direction in parallel with that of Q3Q4, which is perpendicular to Q3Q2. And, ratio m and ratio n can be expressed as in the following equations (23) and (24), respectively, in view of equations (5) to (8) in which coordinates of S1(X*s1,Z*s1), S2(X*s2,Z*s2), T1(X*t1, Z*t1) and T2(X*t2,Z*t2) are given by coordinates of qs1 (X's1,f) and qs2(X's2,f), qt1(X't1,f) and qt2(X't2,f):

$$m = \frac{\overline{O_m S_1}}{\overline{O_m S_2}} = \frac{|X'_{s1}|}{|X'_{s2}|} \cdot \frac{|X'_{s2} \cdot \tan\psi + f|}{|X'_{s1} \cdot \tan\psi + f|} \quad (23)$$

$$n = \frac{\overline{O_m T_1}}{\overline{O_m T_2}} = \frac{|X'_{t1}|}{|X'_{t2}|} \cdot \frac{|f \cdot \tan\psi + X'_{t2}|}{|f \cdot \tan\psi + X'_{t1}|} \quad (24)$$

Equation (23) is given by the X'-coordinate of vanishing characteristic points qs1(X's1) and qs2(X's2), distance f and angle φ, while equation (24) by the X'-coordinate of vanishing characteristic points qt1(X't1), qt2(X't2), distance f and angle φ. With respect to angle φ, tan φ is given by equation (18).

Figure 18:
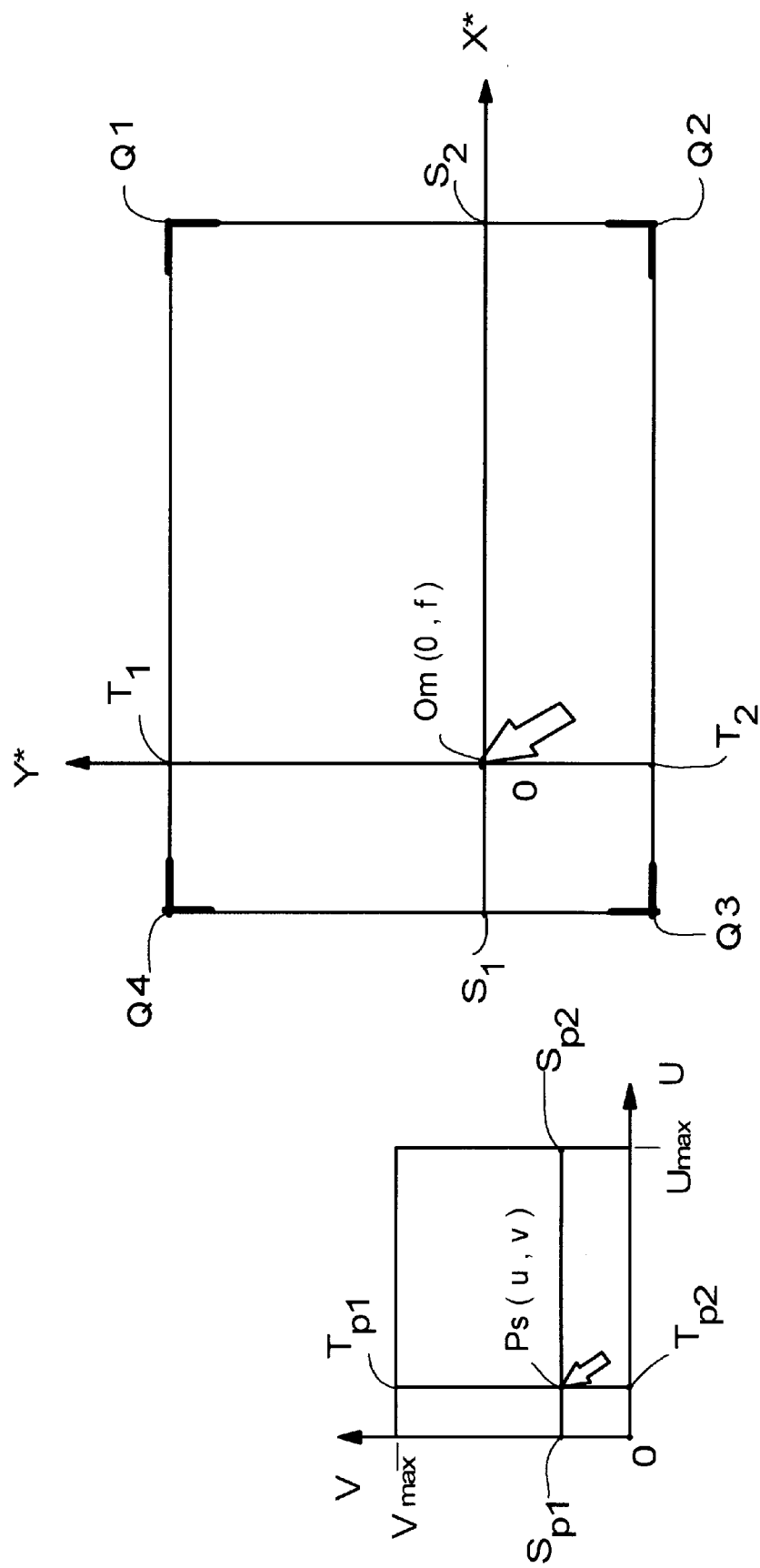
FIG. 18A represents a graph of U-V coordinate in which a point corresponding to characteristic point Q3 is set as origin O.
FIG. 18B represents a graph of X*-Y* coordinate in which Om is set as the origin.

FIGS. 18A and 18B represent conversion from ratio m and ratio n to a coordinate of target point Ps in which characteristic point Q3 is set as the origin of the coordinate. In more detail, FIG. 18B is shown in accordance with X*-Y* coordinate in which Om (0,f), which is in coincidence with target point Ps, is set as the origin, while FIG. 18A shown in accordance with U-V coordinate in which a point corresponding to characteristic point Q3 is set as origin O. Further, characteristic points Q2 and Q4 in FIG. 18B correspond to Umax on U-axis and Vmax on V-axis, respectively, in FIG. 18A. According to FIG. 18A, coordinate of target point Ps (u,v) is given by the following equation (25):

$$P_s(u, v) = \left( \frac{m}{m+1} \cdot U_{\max}, \frac{n}{n+1} \cdot V_{\max} \right) \quad (25)$$

Alternatively, FIG. 17 also gives the ratio m and n expressed by Y'-coordinate of vanishing characteristic points qs1(Y's1), qs2(Y's2), qt1(Y't1) and qt2(Y't2), distance f and angle γ as in the following equations (26) and (27):

$$m = \frac{\overline{O_m S_1}}{\overline{O_m S_2}} = \frac{|Y'_{s1}|}{|Y'_{s2}|} \cdot \frac{|Y'_{s2} - f \cdot \tan\gamma|}{|Y'_{s1} - f \cdot \tan\gamma|} \quad (26)$$

$$n = \frac{\overline{O_m T_1}}{\overline{O_m T_2}} = \frac{|Y'_{t1}|}{|Y'_{t2}|} \cdot \frac{|f - Y'_{t2} \cdot \tan\gamma|}{|f - Y'_{t1} \cdot \tan\gamma|} \quad (27)$$

Equations (26) and (27) are similarly useful to equations (23) and (24) to lead to equation (25).

Simulation for Testifying the Accuracy

The accuracy of detecting the position or attitude according to the principle of the present invention is testified by means of a simulation.

In the simulation, a rectangular plane of 100 inch size (1500 mm×2000 mm) is given, the four corners being the characteristic points, and the target point at the center of the rectangular plane, i.e., m=1, n=1. The attitude of the rectangular relative to the image sensing plane is given by angles, γ=5° and φ=−60°. And, the distance between the target point and the center of the image sensing plane is 2000 mm. On the other hand, the distance f is 5 mm.

According to the above model, the coordinates of characteristic points on the image sensing plane are calculated by means of the ordinary perspective projection matrix. And the resultant coordinates are the base of the simulation.

The following table shows the result of the simulation, in which the attitude parameter, angles γ and φ and the position parameter, ratio m and n are calculated by means of the equations according to the principle of the present invention. The values in the table prove the accuracy of the attitude and position detection according to the present invention.

ATTITUDE OF GIVEN RECTANGULAR PLANE RELATIVE TO IMAGE SENSING PLANE vs. POSITION OF TARGET ON THE GIVEN RECTANGULAR PLANE

|  |  | Case of Rotation of Vanishing line S1S2 by Angle α for Coincidence with X-axis | Case of Rotation of Vanishing line T1T2 by Angle β for Coincidence with Y-axis |
|---|---|---|---|
| Parameters of Attitude | α, β | −8.585 | 0.000 |
|  | tan ψ | −1.710 | −1.730 |
|  | ψ | −59.687 | −59.967 |
|  | tan γ | 0.088 | 0.087 |
|  | γ | 5.044 | 4.988 |
| Position on the plane | m (= OmS1/OmS2) | 0.996 | 0.996 |
|  | n (= OmT1/OmT2) | 1.000 | 1.000 |

Embodiment 2

Figure 19:
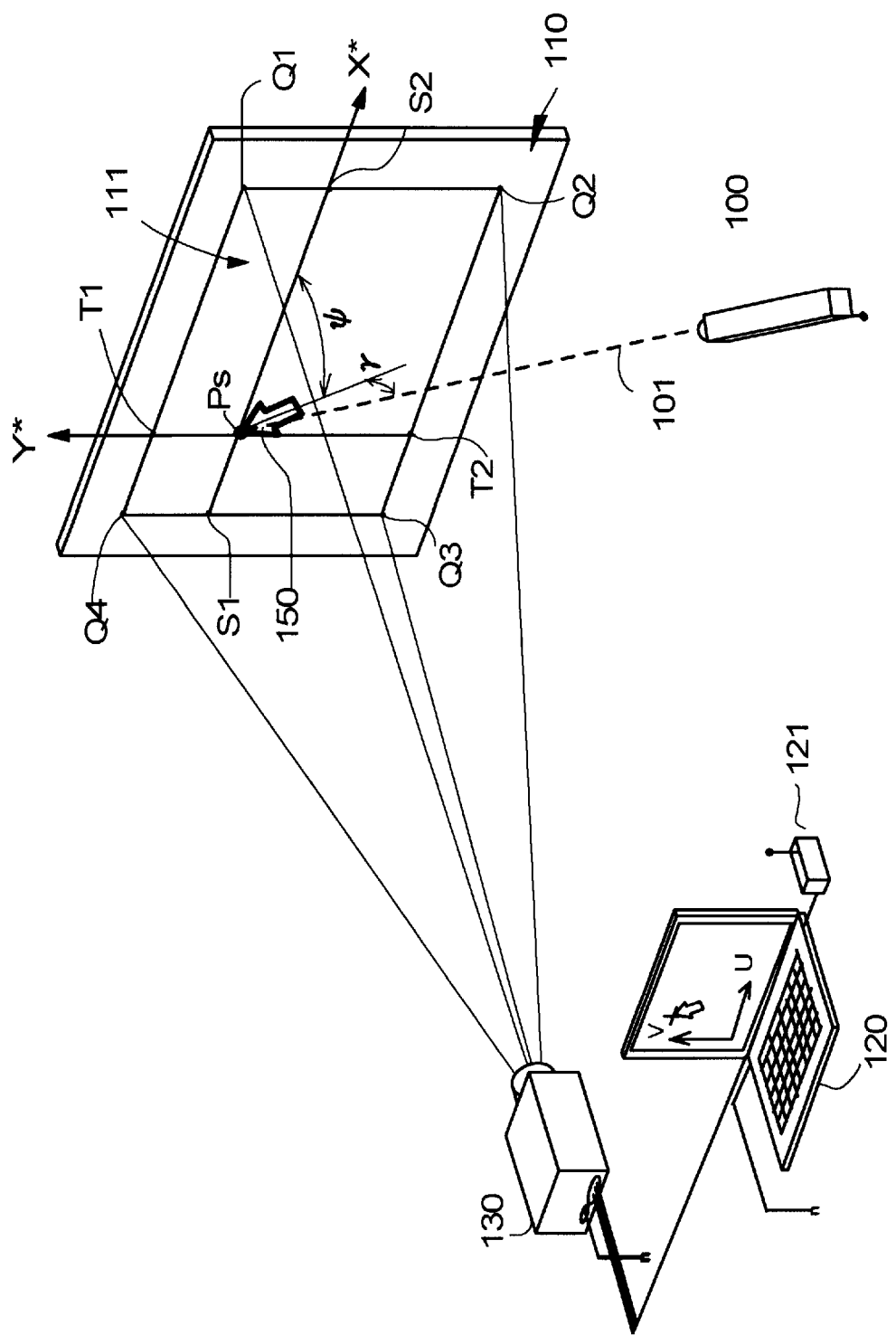
FIG. 19 represents a perspective view of Embodiment 2 according to the present invention.

FIG. 19 represents a perspective view of Embodiment 2 according to the present invention. Embodiment 2 especially relates to a pointing device for controlling the cursor movement or the command execution on the image display of a personal computer. FIG. 19 shows the system concept of the pointing device and its method.

Embodiment 2 corresponds to a system of Graphical User Interface, while Embodiment 1 to a position detector, which realizes the basic function of Graphical User Interface. Thus, the function of Embodiment 1 is quite suitable to Graphical User Interface according to the present invention. The basic principle of Embodiment 1, however, is not only useful in Graphical User Interface, but also in detecting the position of a target point or the attitude of a three-dimensional object in general.

Further, the information of attitude detection according to the present invention is utilized by the position detection, and then by Graphical User Interface. In terms of the position detection or Graphical User Interface, the target point should be aimed for detection. However, any specific target point need not be aimed in the case of solely detecting the attitude of an object as long as the image of necessary characteristic points of the object are formed on the image sensing plane.

Referring back to Embodiment 2 in FIG. 19, 100 is a main body of the pointing device, 110 a given screen plane, 120 a personal computer (hereinafter referred to as PC), 121 a signal receiver for PC 120, and 130 a projector. Projector 130 projects display image 111 on screen plane 110. The four corners Q1, Q2, Q3 and Q4 of display image 111 are the characteristic points, which define the shape of display image 111, the shape being a rectangular. Main body 100 is for detecting coordinates of a target point Ps on screen plane 110 toward which cursor 150 is to be moved. An operator in any desired place relative to screen 110 can handle main body 100. Broken line 101 is the optical axis of the image sensing plane of camera 1 (not shown) located inside main body 100, broken line 101 leading from the center of the image sensing plane perpendicularly thereto to target point Ps on screen plane 110.

According to the Embodiment, the characteristic points correspond to the four corners of display image 111 projected on screen plane 110. However, the characteristic points may exist at any locations within screen plane 110. For example, some points of a geometric shape within display image 111 projected on screen plane 110 may act as the characteristic points. Alternatively, specially prepared characteristic points may be projected within screen plane 110. The characteristic points may not be independent points, but may be the intersection of two pairs of parallel lines which are perpendicular to each other. Further, the characteristic points may not be the projected images, but may be light emitting diodes prepared on screen plane 110 in the vicinity of the display image 111.

Figure 20:
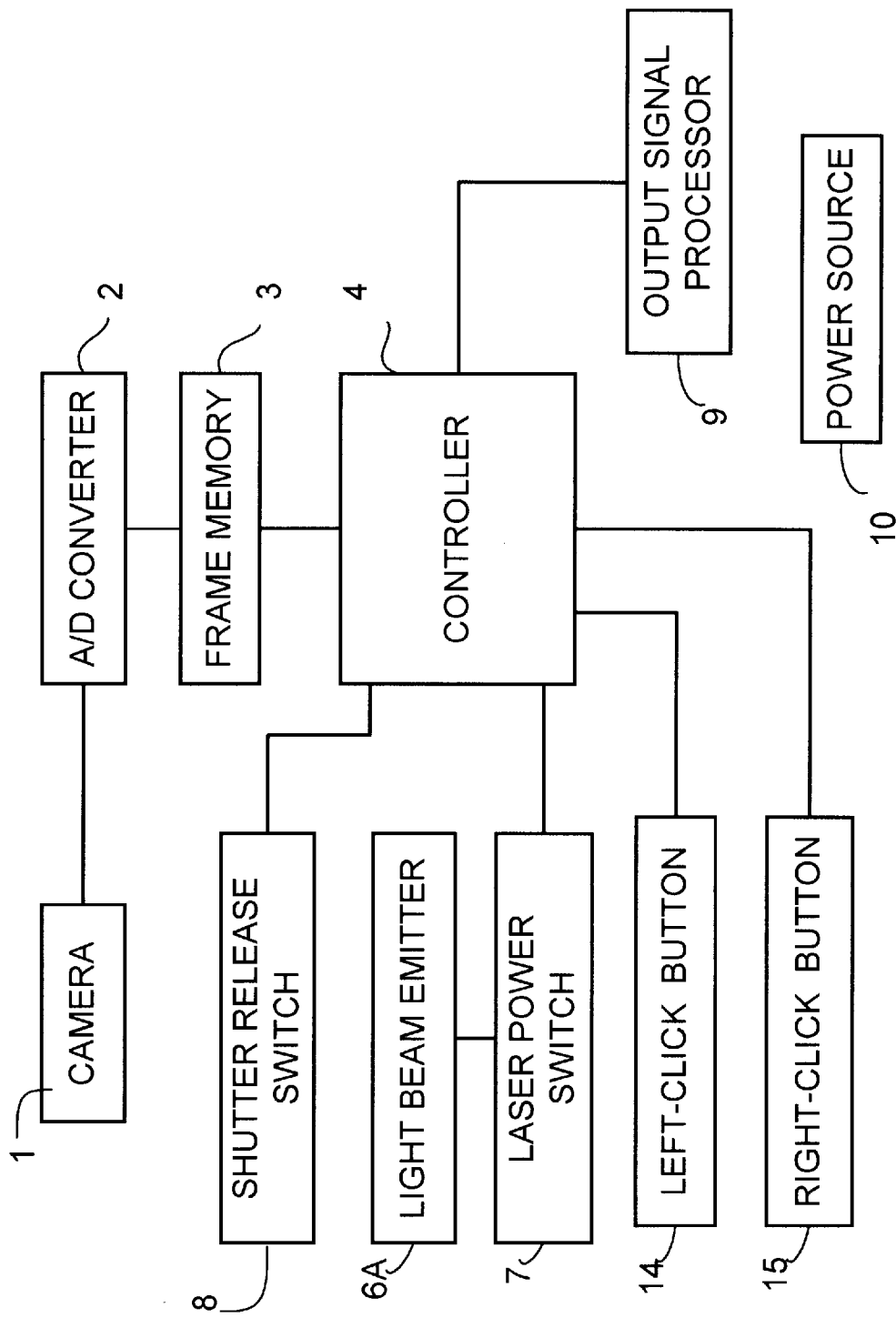
FIG. 20 represents a block diagram of the system concept for main body of Embodiment 2.
Figure 21:
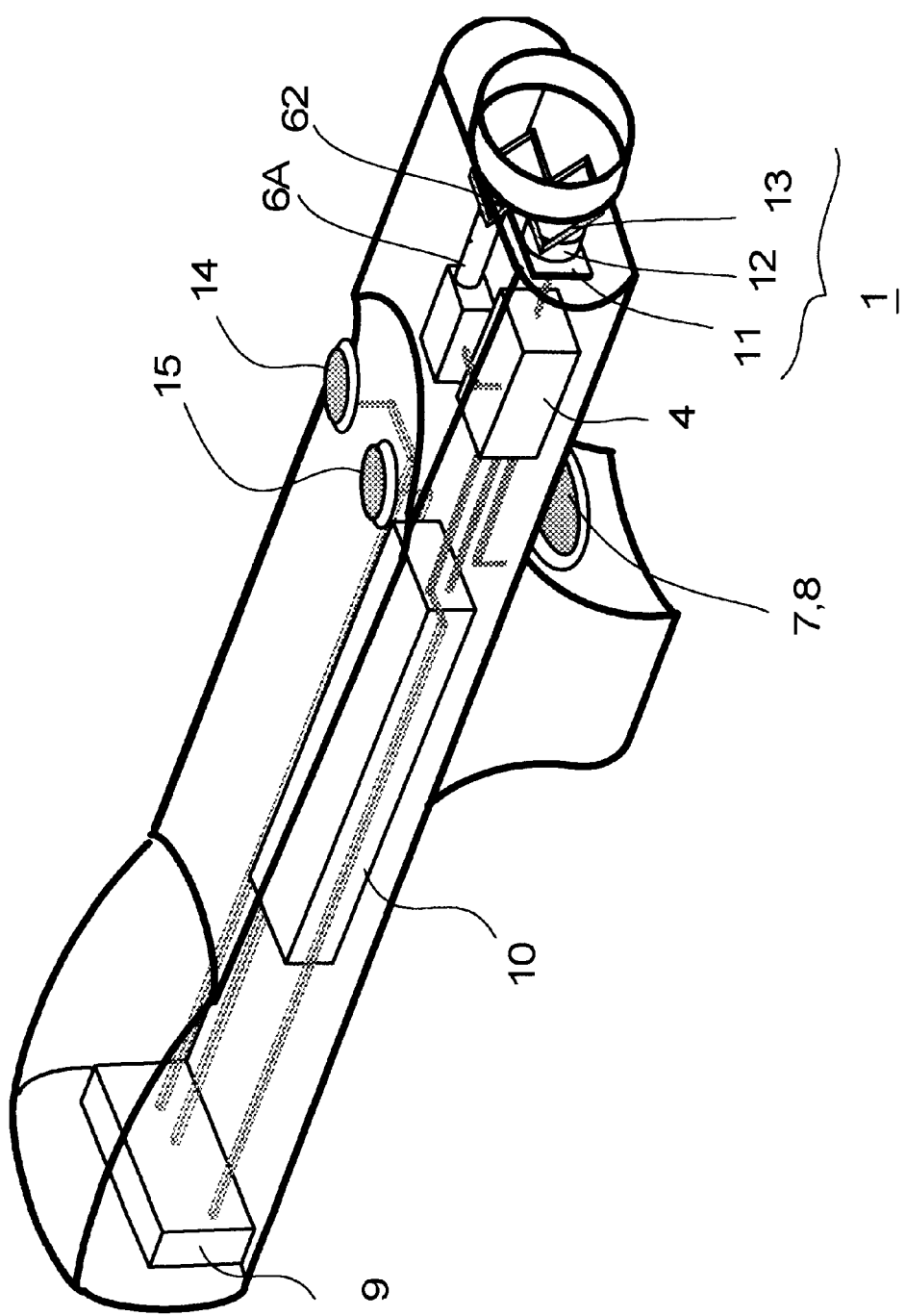
FIG. 21 represents a perspective view of the main body of Embodiment 2.

FIGS. 20 and 21 represent the block diagram and the perspective view of the system concept for main body 100, respectively. The configuration of main body 100 is basically same as Embodiment 1 in FIG. 2. However, left-click button 14 and right-click button 15 are added in FIGS. 20 and 21. Further, image processor 5 of FIG.2 is incorporated in PC 120 in the case of FIGS. 20 and 21. Thus, main body 100 is provided with output signal processor 9 for transferring the image data to PC 120 by way of signal receiver 121.

The functions of left-click button 14 and right-click button 15 are similar to those of ordinary mouse, respectively. For example, left-click button 14 is single-clicked or double-clicked with the cursor at an object such as an icon, a graphics or a text to execute the command related to the object. A click of right-click button 15 causes PC 120 to display pop-up menu at the cursor position, just as the right-button click of the ordinary mouse does. The movement of the cursor is controlled by shutter release switch 8.

Figure 22:
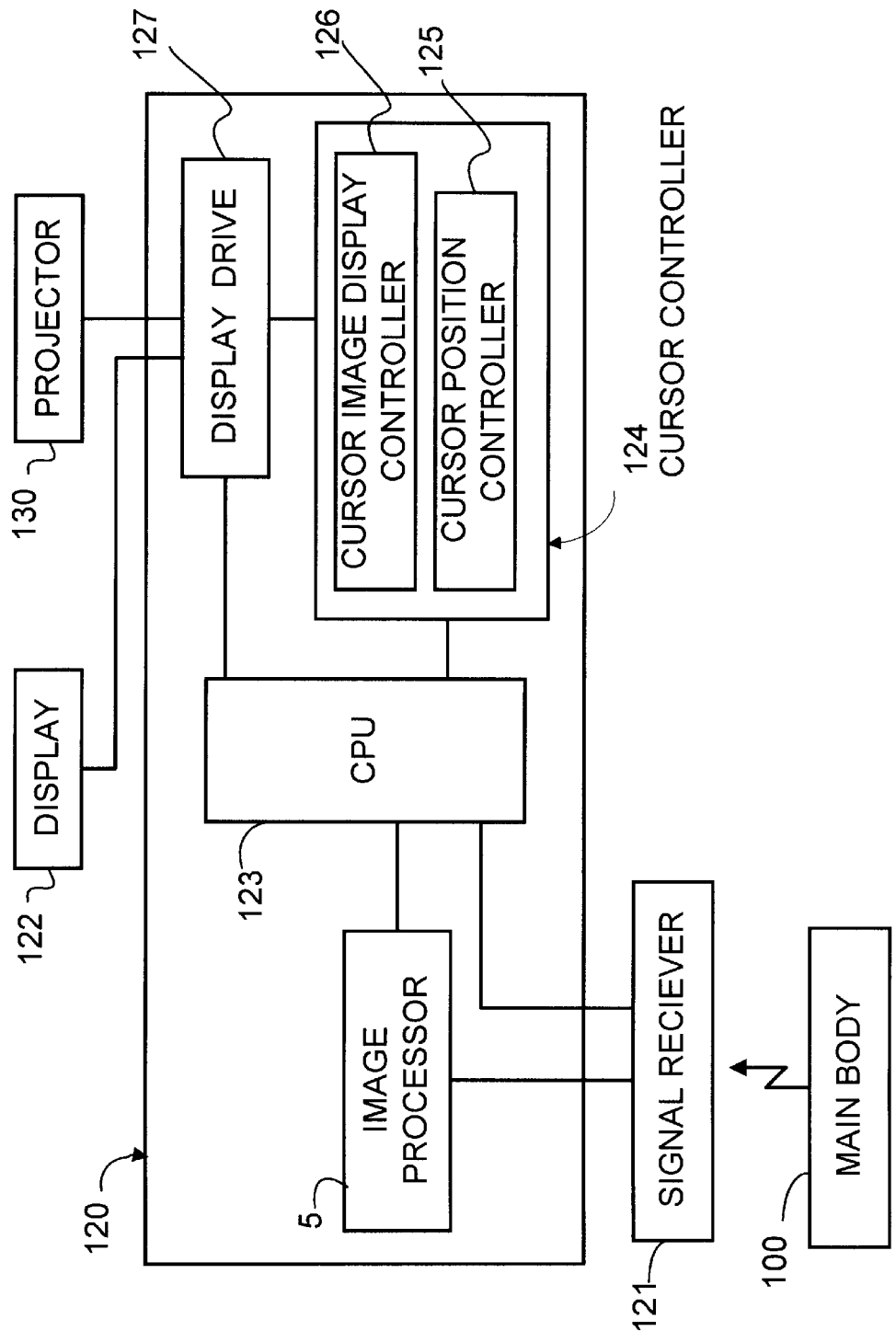
FIG. 22 represents a block diagram of personal computer to which the image data or command execution signal is transferred from the main body.

Now the block diagram of PC 120 to which the image data or command execution signal is transferred from the main body 100 will be described in conjunction with FIG. 22. The detailed explanation of image processor 5, which has been done in Embodiment 1, will be omitted.

PC 120 receives signals from main body 100 at signal receiver 121. Display 122 and projector 130 are connected to PC 120. Display 122, however, is not necessarily required in this case.

Image data transferred by main body 100 is processed by image processor 5 and is output to CPU 123 as the coordinate data of the target point. Cursor controller 124 which corresponds to an ordinary mouse driver controls the motion of the cursor. Cursor controller 124 consists of cursor position controller 125, which converts the coordinate data of the target point into a cursor position signal in the PC display system, and cursor image display controller 126, which controls the shape or color of the cursor. Cursor controller 124 may be practically an application program or a part of the OS (operating system) of PC 120.

Now, the operations of the pointing device of this embodiment will be described in detail. Basic operations of the pointing device are the position control of cursor and the command execution with the cursor at a desired position. The function of the pointing device will be described with respect to these basic operations.

Figure 23:
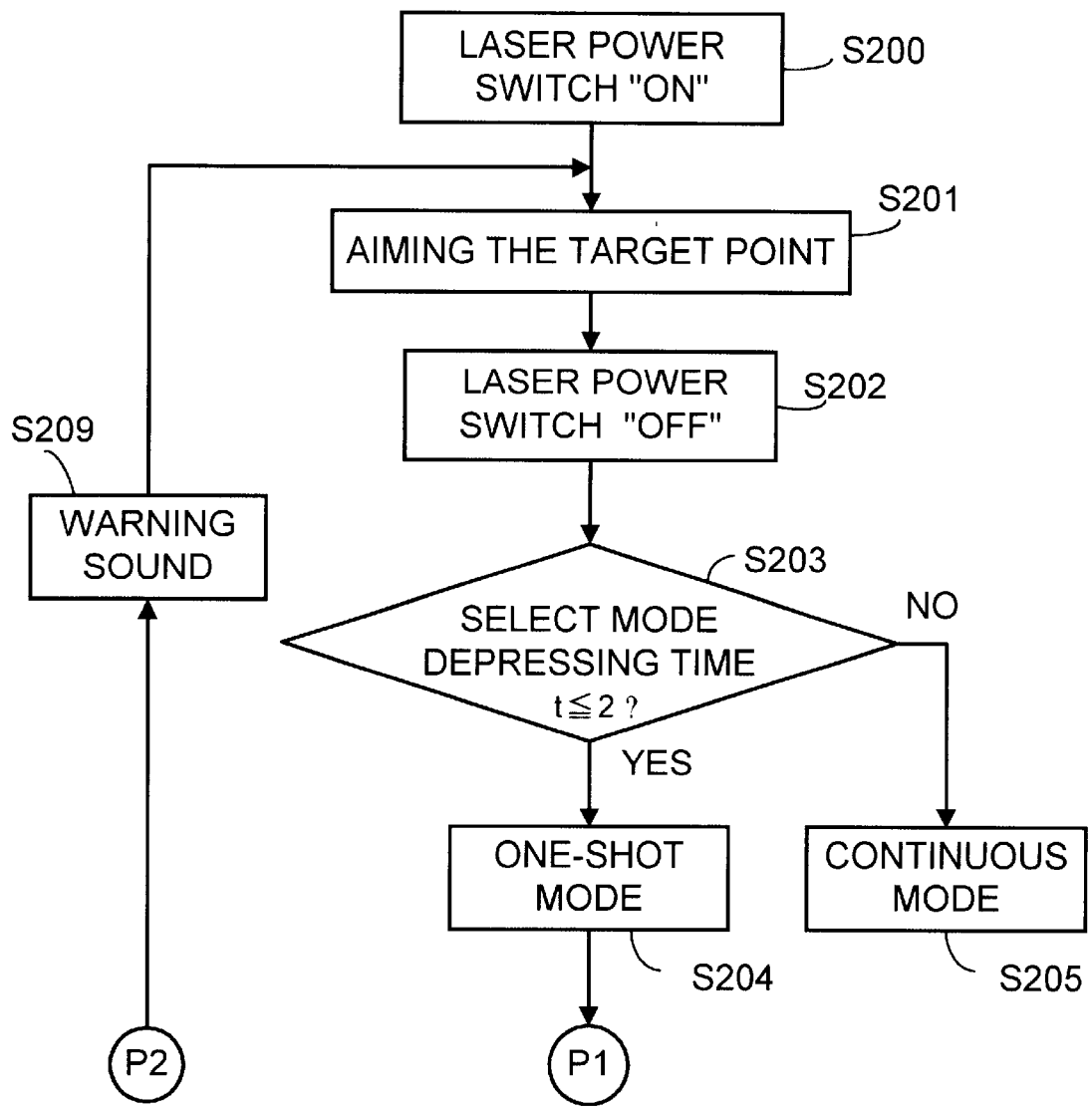
FIG. 23 represents a flow chart showing the operations of Embodiment 2 according to the present invention.
Figure 24:
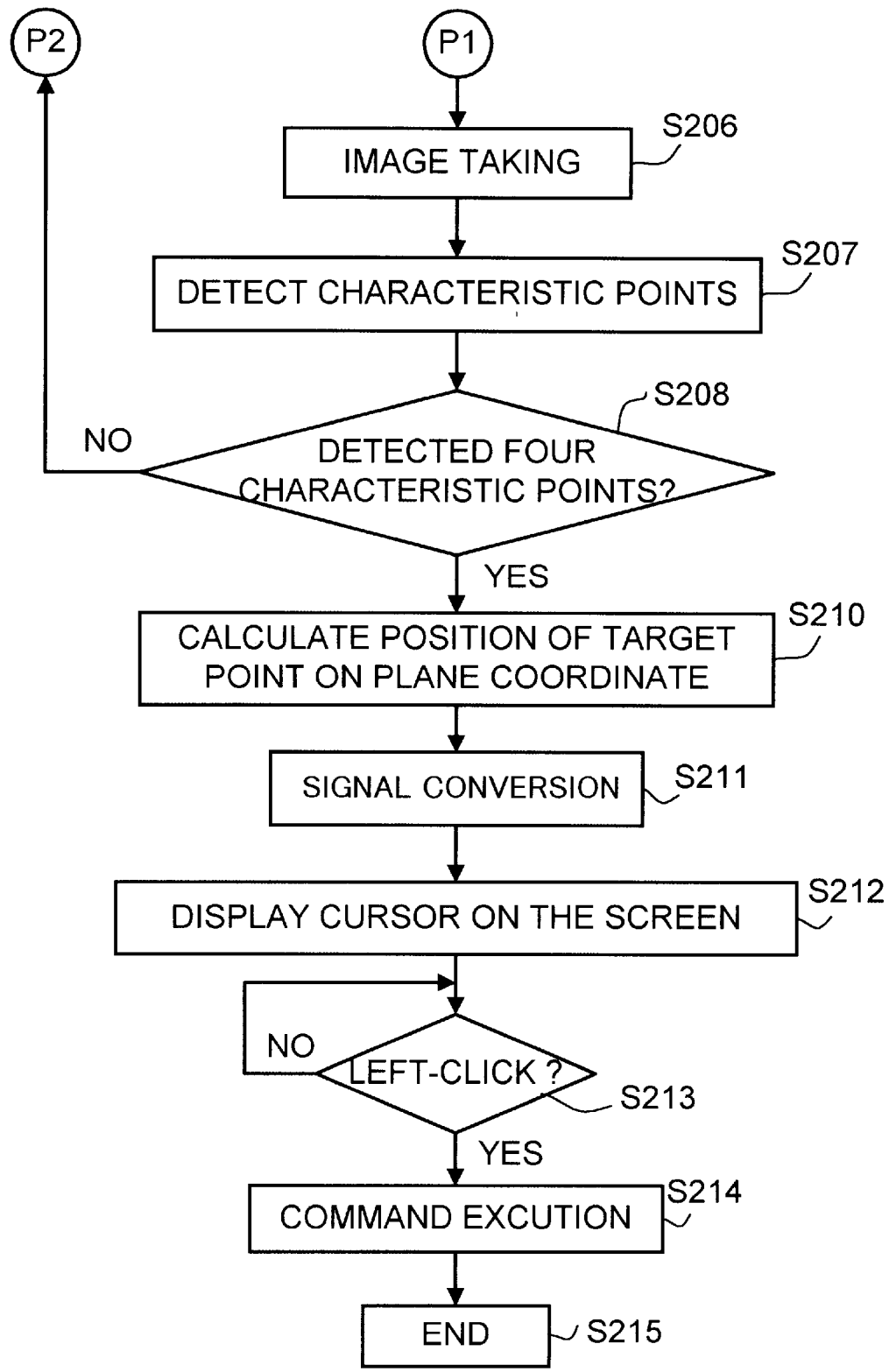
FIG. 24 represents a flow chart showing the operation of Embodiment 2 in the one-shot mode.
Figure 25:
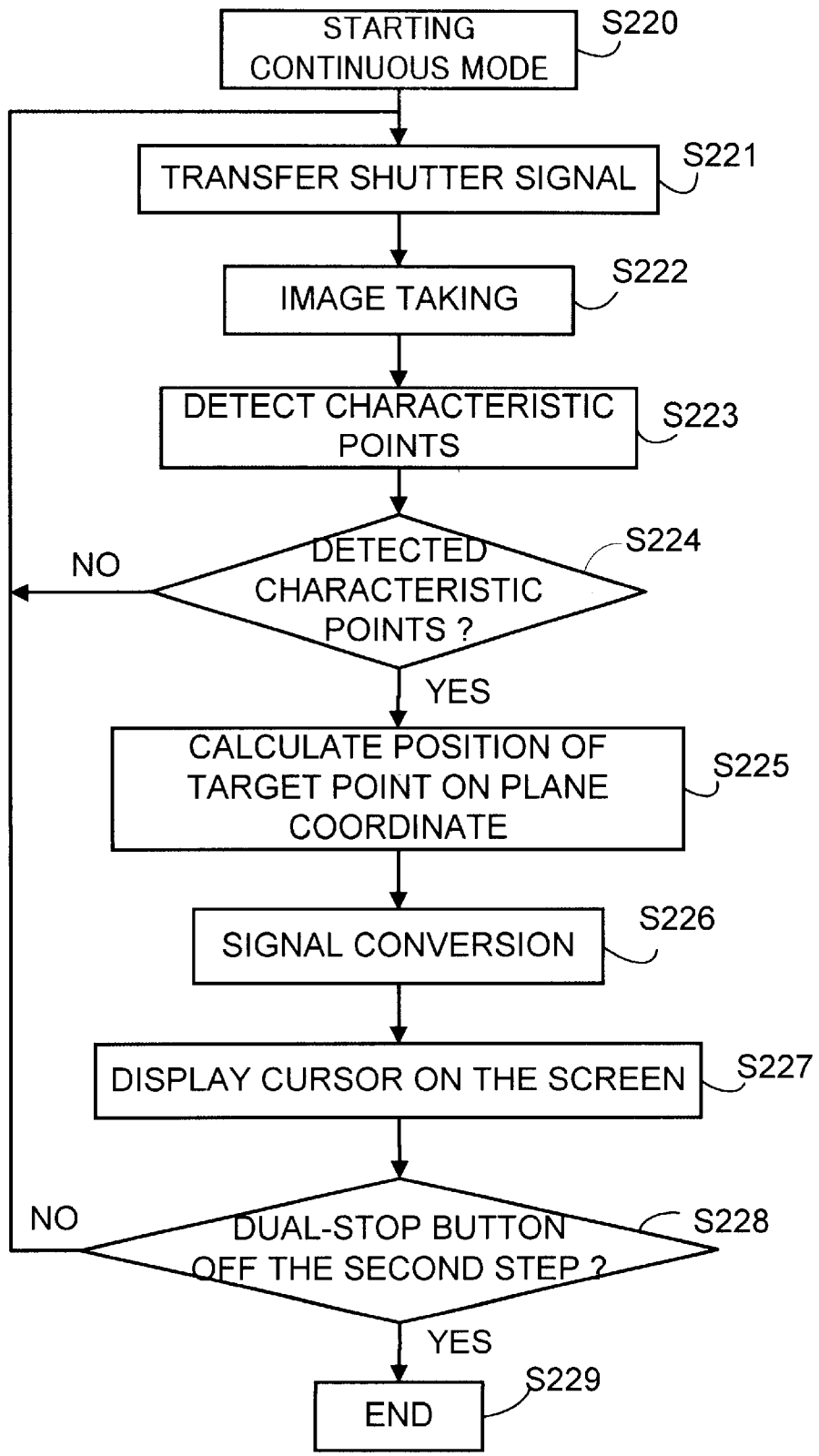
FIG. 25 represents a flow chart showing the operation of Embodiment 2 in the continuous mode.

FIGS. 23, 24 and 25 represent flow charts for the above mentioned operations of the pointing device according to the present invention.

The operation of the pointing device for indicating the target point on the screen and moving the cursor toward the target point is caused by a dual-step button which controls both the shutter release switch 8 and the laser power switch 7. This operation corresponds to that of the ordinary mouse for moving the cursor toward a desired position.

In step S200 in FIG. 23, the power source of laser power switch 7 is turned on by a depression of the dual-step button to the first step, which causes the emission of the infrared laser beam. The operator may point the beam at any desired point on the screen in the similar manner to that in the ordinary laser pointer.

In step S201, the operator aims the laser beam at the target point. Instep S202, the dual-step button is depressed to the second-step to make the laser power switch 7 off. In step S203, it is discriminated whether the mode is an one-shot mode or a continuous mode according to the time duration of depressing the dual-step button to the second step. In this embodiment, a threshold of the time duration is set to two seconds. However, the threshold may be set at any desired duration. If the dual-step button is kept in the second step more than two seconds, it is discriminated that the mode is the continuous mode to select step S205. On the other hand, if the time duration is less than two seconds in step S203, the one-shot mode in S204 is selected.

In the case of the one-shot mode, shutter release switch 8 is turned on to take the image in step S206 of FIG. 24. As steps S207 to S210 in FIG. 24 are the same as the basic flow chart in FIG. 7 described before, the explanation is omitted.

In step S211, the coordinate of the target point is converted into a cursor position signal in the PC display system and transferred to projector 130 by way of CPU 123 and display drive 127. In step S212, projector 130 superimposes the cursor image on the display image 111 at the target point Ps.

In this stage, the operator should decide whether or not to push left-click button 14. In other words, the operator would be willing to click the button if the cursor is successfully moved to the target point. On the other hand, if the desired cursor movement is failed, which would be caused by the depression of the dual-step button with the laser beam at an incorrect position, the operator will not click the button. Step 213 is for waiting for this decision by the operator. In the case of failure in moving the cursor to the desired position, the operator will depress the dual-step button again, and the flow will jump back to step S200 in FIG. 23 to restart the function. On the contrary, if the operator pushes left-click button 14, the flow is advanced to step S214 to execute the command relating to the object on which the cursor is positioned. The command execution signal caused by the left-click button 14 of main body 100 is transmitted to PC 120. Step S215 is the end of the command execution.

In step S212, the cursor on the screen stands still after being moved to the target point. In other words, cursor position controller 125 keeps the once-determined cursor position signal unless shutter release switch 8 is turned on again in the one-shot mode. Therefore, left-click button 14 can be pushed to execute the command independently of the orientation of main body 100 itself if the cursor has been successfully moved to the desired position.

FIG. 25 is a flow chart for explaining the continuous mode, which corresponds to the details of step S205 in FIG. 23. In step 221, shutter release switch 8 is turned on to take the image. In the continuous mode, a train of clock pulses generated by the controller 4 at a predetermined interval governs shutter release switch 8. This interval stands for the interval of a step-by-step movement of the cursor in the continuous mode. In other words, the shorter the interval is, the smoother is the continuous movement of the cursor. The set up of this interval is possible even during the operation by a set up dial or the like (not shown).

Shutter release button 8 is once turned on at every pulse in the train of the clock pulses in Step 221. And, Steps 221 to 227 are completed prior to the next pulse generated, and the next pulse is waited for in Step 221. Thus, Steps 221 to 227 are cyclically repeated at the predetermined interval to cause the continuous movement of the cursor.

The repetition of Steps 221 to 227 continues until the dual-step button is made off the second step. Step 227 is for terminating the continuous mode with the dual-step button made off the second step.

According to a modification of the embodiment, the cyclic repetition of Steps 221 to 227 may be automatically controlled depending on the orientation of the main body 100. In other words, the train of clock pulses is intermitted not to turn on shutter release button 8 in step S221 when the laser beam is outside the area of display image 111, and is generated again when the laser beam comes back inside the area.

Although not shown in the flow in FIG. 25, left-click button 14 may be pushed at any desired time to execute a desired command. Further, if main body 100 is moved with left-click button 14 kept depressed along with dual-step button depressed to the second step, an object in display image 111 can be dragged along with the movement of the cursor.

As described above, the cursor control and the command execution of the embodiment according to the present invention can be conveniently practiced as in the ordinary mouse.

In summary referring back to FIG. 22, the image data taken by the main body 100 with the target point aimed with the laser beam is transmitted to PC 120. In PC 120, the image data is received at signal receiver 121 and transferred to input/output interface (not shown), which processes the image data and transfers the result to image processor 5. With the image processor 5, characteristic points are detected on the basis of the image data to calculate their coordinates. The coordinates of the characteristic points are processed to calculate the coordinate of the target point, which is transferred to cursor position controller 125 to move the cursor. CPU 123 controls those functions. The resultant cursor position corresponds to that of the target point on the screen. Main body also transmits the command execution signal to PC 120 with reference to the position of the cursor.

In more detail, position controller converts the information of the target point given in accordance with the $X^*$-$Y^*$ coordinate as in FIG. 18B into a cursor controlling information given in accordance with the U-V coordinate as in FIG. 18A.

CPU 123 activates a cursor control driver in response to an interruption signal at input/output interface to transmit a cursor control signal to display drive 127. Such a cursor control signal is transferred from display drive 127 to projector 130 to superimpose the image of cursor on the display image.

On the other hand, the command execution signal transmitted from main body executes the command depending on the position of the cursor in accordance with the OS or an application of CPU.

The small and light wait pointing device according to the present invention needs not any mouse pad or the like as in the ordinary mouse, but can be operated in a free space, which greatly increases a freedom of operation. Besides, an easy remote control of PC is possible with a desired object image on a screen plane pointed by an operator himself.

Further, the pointing device according to the present invention may be applied to a gun of a shooting game in such a manner that a target in an image projected on a wide screen is to be aimed and shot by the pointing device as a gun.

Now, a coordinate detection of a target point in an image projected with a distortion on a screen plane will be described.

In a case of projecting an original of true rectangle to a screen plane with the optical axis of the projector perpendicular to the screen plane, the projected image would also be of a true rectangle provided that the optical system of the projector is free from aberrations.

On the contrary, if the original of true rectangle is projected on the screen plane inclined with respect to the optical axis of the projector, an image of a distorted quadrangle would be caused on the screen plane. The main body takes the distorted quadrangle on the screen plane with the optical axis of the main body inclined with respect to the screen plane to cause a further distorted quadrangle on the image sensing plane of the main body.

According to the principle of the present invention, however, the calculations are made on the assumption that the image on the screen plane is of a true rectangle. This means that the distorted quadrangle on the image sensing plane is considered to be solely caused by the inclination of the screen plane with respect to optical axis of the main body. In other words, the calculated values do not represent actual parameters of the attitude of the screen plane on which the first mentioned distorted quadrangle is projected.

But, an imaginary parameters are calculated according to an interpretation that the final distorted quadrangle on the image sensing plane would be solely caused by the attitude of the screen plane on which a true rectangle is projected.

More precisely, the main body cannot detect at all whether or not the distorted quadrangle on the image sensing plane is influenced by the inclination of the screen plane with respect to optical axis of the projector. But, the main body carries out the calculation in any case on the interpretation that the image projected on the screen plane is of a true rectangle. Ratio m and ratio n for determining the position of the target point on the screen plane are calculated on the basis of thus calculated attitude.

According to the present invention, however, it is experimentally confirmed that ratio m and n calculated in accordance with the above manner practically represent the position of the target on the original image in the projector as long as such original image is of a true rectangle. In other words, the determination of the target on the original image in the projector is free from the inclination of the optical axis of the projector with respect to the screen plane, which inclination would cause a distorted quadrangle on the screen plane. Therefore, a correct click or drag in the case of the graphic user interface of a computer or a correct shot of a target in the case of shooting game is attained freely from a possible distortion of the image projected on a wide screen.

What is claimed is:

1. A graphical user interface for generating an interface signal with an aimed-at target on a display comprising:
   an image sensor having an image plane on which an image including characteristic points is formed, a predetermined position of the image plane corresponding to a target point;
   a processor for calculating the position of the target on the display using parameters of an attitude of the display relative to the image plane on the basis of four characteristic points; and
   a signal generator for generating an interface signal with the position of the target calculated.

2. The graphical user interface according to claim 1, further comprising an aiming device for helping the image sensor to form the image of the display with the target in coincidence with the predetermined position.

3. The graphical user interface according to claim 1, further comprising an aiming device including a light beam emitter for emitting a light beam along the optical axis of the image sensor toward the display, whereby the image of the target is in coincidence with the predetermined position on the image plane when the light beam hits the target on the display.

4. The graphical user interface according to claim 1, further comprising an aiming device including a viewfinder for aiming the target.

5. The graphical user interface according to claim 4, wherein the viewfinder includes an optical finder for optically aiming the target.

6. The graphical user interface according to claim 5, wherein the viewfinder includes a monitor of the output of the image sensor.

7. The graphical user interface according to claim 1, further comprising a controller for ordering the image sensor to take the image of the display.

8. The graphical user interface according to claim 7, wherein the controller is designed to order the image sensor to take one image in response to a manual operation.

9. The graphical user interface according to claim 7, wherein the controller is designed to order the image sensor to take a series of images in succession.

10. The graphical user interface according to claim 1, wherein the processor includes an image processor for identifying the positions of the characteristic points on the image plane, a first processor for calculating a first data on the basis of the positions of the characteristic points on the image plane, and a second processor for calculating a second data on the basis of the first data and the positions of the characteristic points on the image plane, the position of the target on the display being detected on the basis of the second data.

11. A position detector for detecting a position of a target point on a given plane having a plurality of characteristic points comprising:
   an image sensor having an image plane on which an image of the given plane is formed with the characteristic points included in the image, a point of the image which is formed at a predetermined position of the image plane corresponding to the target point to be detected on the given plane;
   an image processor for identifying the positions of the characteristic points on the image plane;
   a first processor for calculating a first data on the basis of the positions of the characteristic points on the image plane; and
   a second processor for calculating a second data on the basis of the first data and the positions of the characteristic points on the image plane, the position of the target point on a given plane being detected on the basis of the second data.

12. The position detector according to claim 11, wherein the first data includes information of attitude of the given plane relative to the image plane.

13. The position detector according to claim 11, wherein the first processor calculates the first data in accordance with the three-dimensional perspective projection.

14. The position detector according to claim 13, wherein the first processor includes a calculator for calculating a pair of vanishing points on the basis of the positions of the characteristic points on the image plane.

15. The position detector according to claim 14, wherein the first processor rotates the positions of the characteristic points around an axis perpendicular to the image plane so that one of the vanishing points comes on one of the coordinate axes on the image plane.

16. The position detector according to claim 15, wherein the second processor includes a first line calculator for calculating a first line between the predetermined position and one of the vanishing point, a second line calculator for calculating a second line between a pair of characteristic points and a intersection calculator for calculating an intersection between the first and second lines.

17. The position detector according to claim 11, wherein the first processor includes a calculator for calculating a pair of vanishing points on the basis of the positions of the characteristic points on the image plane, and wherein the second processor includes a first line calculator for calculating a first line between the predetermined position and one of the vanishing point, a second line calculator for calculating a second line between the position of a pair of characteristic points and a intersection calculator for calculating an intersection between the first and second lines.

18. The position detector according to claim 11, further comprising an aiming device for helping the image sensor to form the image of the given plane with the target point in coincidence with the predetermined position.

19. The position detector according to claim 18, wherein the aiming device includes a light beam emitter for emitting a light beam along the optical axis of the image sensor toward the given plane, whereby the image of the target point is in coincidence with the predetermined position on the image plane when the light beam hits the target point on the given plane.

20. The position detector according to claim 18, wherein the aiming device includes a viewfinder for aiming the target point.

21. An attitude detector for detecting an attitude of a given plane having a plurality of characteristic points comprising:
- an image sensor having an image plane on which an image is formed with four characteristic points included in the image, a predetermined position being the origin of the coordinates of the image plane;
- a helping device for aiming the given plane;
- an image processor for identifying the positions of four characteristic points on the image plane;
- a first processor for calculating a pair of vanishing points on the basis of the positions of four characteristic points on the image plane; and
- a second processor for calculating intersection points on the basis of the vanishing points and the positions of the four characteristic points on the image plane, the attitude of the given plane being detected on the basis of the intersection points.

22. The attitude detector according to claim 21, wherein the first processor rotates the positions of the characteristic points around an axis perpendicular to the image plane so that one of the vanishing points comes on one of the coordinate axes on the image plane.

23. The attitude detector according to claim 21, wherein the second processor includes a first line calculator for calculating a first line between the predetermined point and one of the vanishing points, a second line calculator for calculating a second line between a pair of characteristic points and a intersection calculator for calculating an intersection between the first and second lines.

24. The attitude detector according to claim 21, wherein the first processor includes a calculator for calculating a pair of vanishing points on the basis of the positions of the characteristic points on the image plane, and wherein the second processor includes a first line calculator for calculating a first line between the predetermined point and one of the vanishing points, a second line calculator for calculating a second line between a pair of characteristic points and a intersection calculator for calculating an intersection between the first and second lines.

25. The attitude detector according to claim 21, wherein the helping device includes a light beam emitter for emitting a light beam along the optical axis of the image sensor toward the given plane.

26. The attitude detector according to claim 21, wherein the helping device includes a viewfinder with a cross being optically equivalent to the predetermined position.

27. A graphical user interface for generating an interface signal with an aimed-at target on a display comprising:
- an image sensor having an image plane on which an image including characteristic points is formed, a predetermined position of the image plane corresponding to the target;
- an aiming device for helping the image sensor to form the image of the display with the target in coincidence with the predetermined position;
- a transmitter for transmitting the output of the image sensor to an outside processor for a calculation of the position of the target on the display relative to four characteristic points; and
- a signal generator for generating an interface signal with the position of the target calculated.

28. The graphical user interface according to claim 27, wherein the aiming device includes a light beam emitter for emitting a light beam along the optical axis of the image sensor toward the display, whereby the image of the target is in coincidence with the predetermined position on the image plane when the light beam hits the target on the display.

29. The graphical user interface according to claim 27, wherein the aiming device includes a viewfinder for aiming the target.

30. The graphical user interface according to claim 27, the graphical user interface is for use in a computer.

31. The graphical user interface according to claim 27, the graphical user interface is for use in a shooting game.

* * * * *